US010055342B2

(12) United States Patent
Bourd et al.

(10) Patent No.: US 10,055,342 B2
(45) Date of Patent: Aug. 21, 2018

(54) HARDWARE-BASED ATOMIC OPERATIONS FOR SUPPORTING INTER-TASK COMMUNICATION

(71) Applicant: QUALCOMM Incorporated, San Diego, CA (US)

(72) Inventors: Alexei Vladimirovich Bourd, San Diego, CA (US); Swapnil Pradipkumar Sakharshete, San Diego, CA (US); Fei Xu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/219,696

(22) Filed: Mar. 19, 2014

(65) Prior Publication Data

US 2015/0269065 A1 Sep. 24, 2015

(51) Int. Cl.
*G06F 12/02* (2006.01)
*G06F 9/54* (2006.01)
*G06F 9/52* (2006.01)

(52) U.S. Cl.
CPC .......... *G06F 12/023* (2013.01); *G06F 9/526* (2013.01); *G06F 9/54* (2013.01); *G06F 9/546* (2013.01)

(58) Field of Classification Search
CPC ............... G06F 2003/0691; G06F 2003/0697
USPC ................ 711/147, 154–155, 169; 719/312; 712/20–22, 28–31, 225
See application file for complete search history.

(56) References Cited

U.S. PATENT DOCUMENTS

| 5,742,785 A | 4/1998 | Stone et al. |
| 5,835,742 A * | 11/1998 | James .................. G06F 13/4036 710/112 |
| 7,627,723 B1 * | 12/2009 | Buck ..................... G06F 9/3001 711/155 |
| 8,359,603 B1 | 1/2013 | McCann et al. |
| 2008/0052688 A1 * | 2/2008 | O'Brien .................. G06F 8/443 717/140 |

(Continued)

OTHER PUBLICATIONS

Singhal, A., Van der Wijngaart, R. and P.Barry, "Atomic Read Modify Write Primitives for I/O Devices," Intel White Paper, Aug. 2008.*

(Continued)

*Primary Examiner* — Tracy A Warren
(74) *Attorney, Agent, or Firm* — Shumaker & Sieffert, P.A.

(57) ABSTRACT

This disclosure describes techniques for supporting inter-task communication in a parallel computing system. The techniques for supporting inter-task communication may use hardware-based atomic operations to maintain the state of a pipe. A pipe may refer to a First-In, First-Out (FIFO)-organized buffer that allows various tasks to interact with the buffer as data producers or data consumers. Various pipe implementations may use multiple state parameters to define the state of a pipe. The hardware-based atomic operations described in this disclosure may modify multiple pipe state parameters in an atomic fashion. Modifying multiple pipe state parameters in an atomic fashion may avoid race conditions that would otherwise occur when multiple producers and/or multiple consumers attempt to modify the state of a pipe at the same time. In this way, pipe-based inter-task communication may be supported in a parallel computing system.

22 Claims, 14 Drawing Sheets

(56) References Cited

U.S. PATENT DOCUMENTS

2011/0078249 A1\* 3/2011 Blocksome ............ G06F 9/544
 709/206

OTHER PUBLICATIONS

Nyland, L. and S. Jones, "Understanding and Using Atomic Memory Operations", GPU Technology Conference, 2013.\*
Munshi, "The OpenCL C Specification", Khronos OpenCL Working Group, Version 2.0, Document Revision 11, , Jul. 13, 2013, 212 pp.
Munshi, "The OpenCL Extension Specification", Khronos OpenCL Working Group, Version 2.0, Document Revision 11, , Jul. 13, 2013, 164 pp.
Munshi, "The OpenCL Specification", Khronos OpenCL Working Group, Version 2.0, Document Revision 11, , Jul. 13, 2013, 281 pp.
International Search Report and Written Opinion from International Application No. PCT/US2015/018978, dated May 15, 2015, 9 pages.
International Preliminary Report on Patentability from International Application No. PCT/US2015/018987, dated Jun. 23, 2016, 7 pp.

\* cited by examiner

```
1   #define FST_PKT 0  /* First packet offset */
2   #define PKT_CNT 1  /* Packet count */
3   #define RES_CNT 2  /* Reserved packet count */
4   #define NUM_RES 3  /* Number of reservations*/

5   atomic_reserve_write
6   (
7       uint32 *pipe_addr,
8       uint32 pipe_size_minus_one,
9       uint32 max_depth,
10      uint32 num_packets
11  )
12  {
13      uint32 cnts[4] = load(pipe_addr); // 128-bit load 14      // Return 96-bit to the caller
15      return cnts [FST_PKT], cnts[PKT_CNT], cnts[RES_CNT];

16      if((max_depth - cnts[PKT_CNT] - cnts[RES_CNT]) >= num_packets) {
17          cnts[RES_CNT] += num_packets;
18          if(num_packet != 0) {
19              cnts[NUM_RES] ++;
20          }
21          store(pipe_addr, cnts); // 128-bit store
22      }
23  }
```

FIG. 2

```
1    #define FST_PKT  0  /* First packet offset */
2    #define PKT_CNT  1  /* Packet count */
3    #define RES_CNT  2  /* Reserved packet count */
4    #define NUM_RES  3  /* Number of reservations*/

5    void atomic_commit_write(uint32 pipe_addr)
6    {
7      uint32 cnts[4] = load(pipe_addr);  // 128 bit load
8      cnts[NUM_RES]--;
9      if(cnts[NUM_RES] == 0){
10       cnts[PKT_CNT] += cnts[RES_CNT];
11       cnts[RES_CNT] = 0;
12     }
13     store(pipe_addr, cnts);  // store the modified pipe counters back to memory.
14   }
```

FIG. 3

```
1   #define FST_PKT 0  /* First packet offset */
2   #define PKT_CNT 1  /* Packet count */
3   #define RES_CNT 2  /* Reserved packet count */
4   #define NUM_RES 3  /* Number of reservations*/

5   atomic_reserve_read
6   (
7       uint32 *pipe_addr,
8       uint32 pipe_size_minus_one,
9       uint32 max_depth,
10      uint32 num_packets
11  )
12  {
13      uint32 cnts[4] = load(pipe_addr); // 128-bit load 14      // Return 96-bit to the caller
15      return cnts[FST_PKT], cnts [PKT_CNT], cnts[RES_CNT];

16      if((cnts[RES_CNT] + num_packets) <= cnts[PKT_CNT]) {
17          cnts[RES_CNT] += num_packets;
18          if(num_packets != 0){
19              cnts[NUM_RES] ++;
20          }
21          store(pipe_addr, cnts); // 128-bit store
22      }
23  }
```

FIG. 4

```
1   #define FST_PKT  0  /* First packet offset */
2   #define PKT_CNT  1  /* Packet count */
3   #define RES_CNT  2  /* Reserved packet count */
4   #define NUM_RES  3  /* Number of reservations*/

5   void atomic_commit_read(uint32 *pipe_addr, uint32 pipe_size_minus_one)
6   {
7       uint32 cnts[4] = load(pipe_addr); // 128 bit load
8       cnts[NUM_RES]--;
9       if(cnts[NUM_RES] == 0){
10          cnts[FST_PKT] = (cnts[FST_PKT] + cnts[RES_CNT]) & pipe_size_minus_one;
11          cnts[PKT_CNT] -= cnts[RES_CNT];
12          cnts[RES_CNT] = 0;
13      }
14      store(pipe_addr, cnts); // store the modified pipe counters back to memory.
15  }
```

FIG. 5

HARDWARE-BASED ATOMIC OPERATIONS FOR SUPPORTING INTER-TASK COMMUNICATION

TECHNICAL FIELD

This disclosure relates to computing systems, and more particularly, to parallel computing systems.

BACKGROUND

Parallel programming models may support one or both of task-parallelism and data-parallelism in order to solve computational problems. Task-parallelism may allow computational problems to be divided up into multiple tasks. The tasks may be executed sequentially, concurrently, and/or in parallel on one or more processor cores. Data-parallelism may allow the same set of operations to be performed in parallel on different sets of data by distributing the data to different processing elements and causing each of the processing elements to perform the same set of operations on their assigned set of data.

Multi-core processors may be used to support task-parallelism where each core is configured to execute a particular task. In some cases, one or more of the cores in a multi-core processor may be a single instruction, multiple data (SIMD) processor or a single program, multiple data (SPMD) processor that may include multiple processing elements to support data-parallelism. In such cases, tasks that support data-level parallelism may be able to be executed either sequentially or in parallel on a multi-core processor.

Several different types of processors may support task-parallelism and/or data-parallelism including a multi-core central processing unit (CPU), a graphics processing unit (GPU), a digital signal processor (DSP), a Cell Broadband Engine (Cell/B.E.) processor, etc. Although GPUs were traditionally designed to support the rendering of three-dimensional (3D) graphics to a display, the programmable shader architecture included in many modern GPUs can be used to efficiently support both task-parallelism and data-parallelism found in general-purpose, non-graphics specific programs that are programmed using a parallel programming model. Using the parallel architecture of a GPU to execute non-graphics specific programs may be referred to as general-purpose computing on graphics processing units (GPGPU).

SUMMARY

This disclosure describes techniques for supporting inter-task communication in a parallel computing system. The techniques for supporting inter-task communication may use hardware-based atomic operations to maintain the state of a pipe. A pipe may refer to a buffer that allows various tasks to interact with the buffer as data producers or data consumers. Various pipe implementations may use multiple state parameters to define the state of a pipe, and these state parameters may need to be modified each time a data producer or consumer interacts with the pipe. The hardware-based atomic operations described in this disclosure may modify multiple pipe state parameters in an atomic fashion. Modifying multiple pipe state parameters in an atomic fashion may avoid race conditions that would otherwise occur when multiple producers and/or multiple consumers attempt to modify the state of a pipe at the same time. In this way, pipe-based inter-task communication may be supported in a parallel computing system.

In one example, this disclosure describes a method that includes performing, with one or more processors, a hardware-based atomic read-modify-write operation that modifies two or more pipe state parameters that are indicative of a state of a pipe. The pipe corresponds to data buffer for supporting inter-task communication.

In another example, this disclosure describes a device that includes one or more processors configured to perform a hardware-based atomic read-modify-write operation that modifies two or more pipe state parameters that are indicative of a state of a pipe. The pipe corresponds to a data buffer for supporting inter-task communication.

In another example, this disclosure describes an apparatus that includes means for storing two or more pipe state parameters that are indicative of a state of a pipe. The pipe corresponds to a data buffer for supporting inter-task communication. The apparatus further includes means for performing a hardware-based atomic read-modify-write operation that modifies the two or more pipe state parameters.

In another example, this disclosure describes a non-transitory computer-readable storage medium storing instructions that, when executed, cause one or more processors to perform a hardware-based atomic read-modify-write operation that modifies two or more pipe state parameters that are indicative of a state of a pipe. The pipe corresponds to a data buffer for supporting inter-task communication.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2 is a conceptual diagram illustrating example pseudo-code that defines the interface and functionality of an example atomic reserve write command according to this disclosure.

FIG. 3 is a conceptual diagram illustrating example pseudo-code that defines the interface and functionality of an example atomic commit write command according to this disclosure.

FIG. 4 is a conceptual diagram illustrating example pseudo-code that defines the interface and functionality of an example atomic reserve read command according to this disclosure.

FIG. 5 is a conceptual diagram illustrating example pseudo-code that defines the interface and functionality of an example atomic commit read command according to this disclosure.

DETAILED DESCRIPTION

Figure 1:
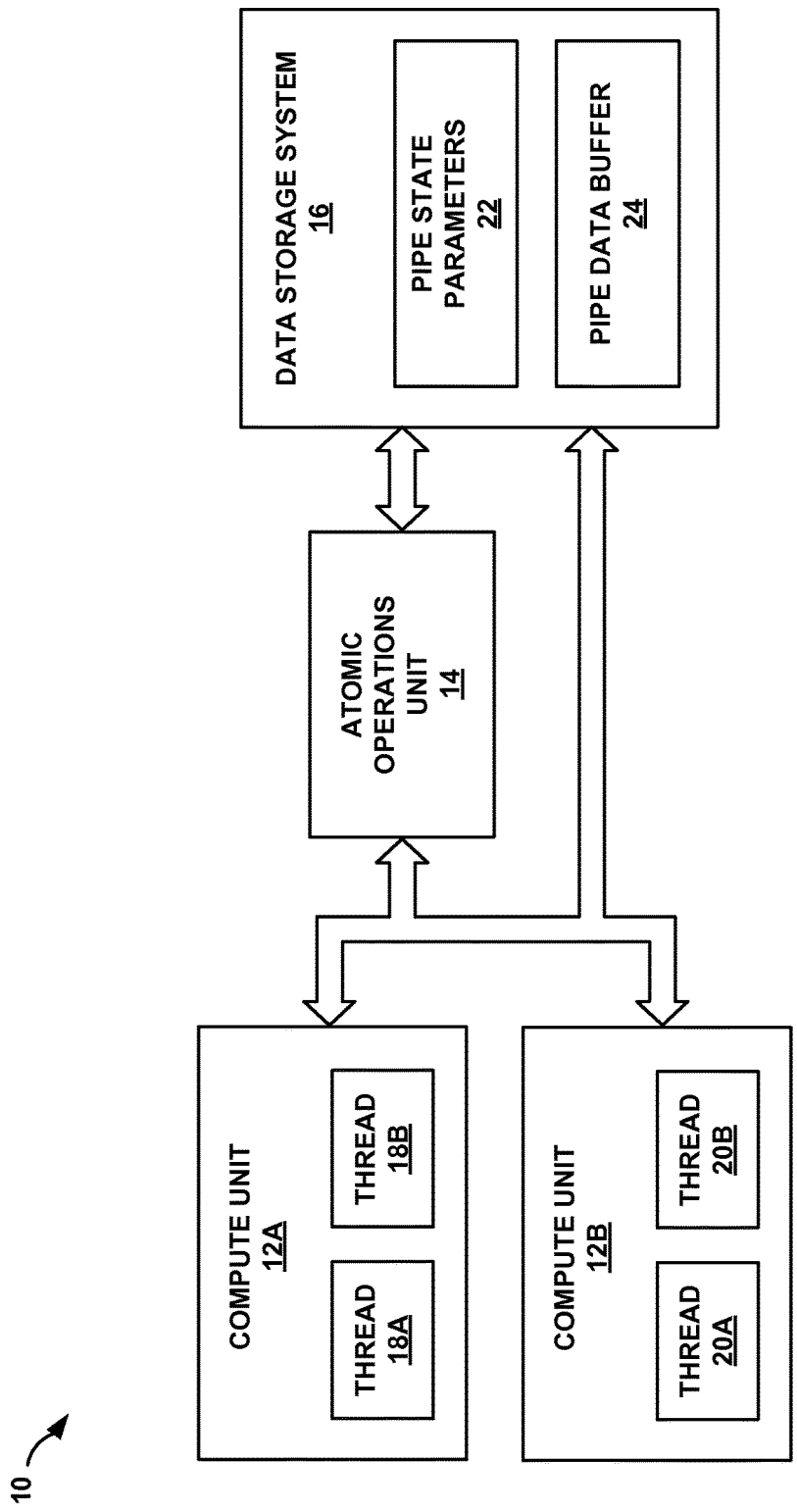
FIG. 1 is a block diagram illustrating an example computing system that implements the hardware-based atomic operations of this disclosure.

This disclosure describes techniques for supporting inter-task communication in a parallel computing system. The techniques for supporting inter-task communication may use hardware-based atomic operations to maintain the state of a pipe. A pipe may refer to a First-In, First-Out (FIFO)-organized buffer that allows various tasks to interact with the buffer as data producers or data consumers. Various pipe implementations may use multiple state parameters to define the state of a pipe, and these state parameters may need to be modified each time a data producer or consumer interacts with the pipe. The hardware-based atomic operations described in this disclosure may modify multiple pipe state parameters in an atomic fashion. Modifying multiple pipe state parameters in an atomic fashion may avoid race conditions that would otherwise occur when multiple producers and/or multiple consumers attempt to modify the state of a pipe at the same time. In this way, pipe-based inter-task communication may be supported in a parallel computing system.

A computational problem may be divided up into multiple tasks that are executed sequentially, concurrently, and/or in parallel on one or more processor cores. A task may refer to a program that is executed by a parallel computing system. A thread may refer to an instance of a task that is executed by a single processing element in the parallel computing system. A task may be alternatively referred to herein as a kernel, and a thread may be alternatively referred to herein as a work-item. In some cases, different tasks that are executed by a parallel computing system may need to communicate with each other. For example, one task may generate data based on data that is generated by another task.

Pipes may be used to allow different tasks to communicate with each other. From a programmer's perspective, a pipe may provide a FIFO-organized buffer that allows various tasks to interact with the buffer as data producers or data consumers. A FIFO-organized buffer may refer to a buffer where the write interface and the read interface operate according to a FIFO principle. A write interface that operates according to a FIFO principle may refer to an interface that appends data to be written to the end of any data that is already stored in the buffer. A read interface that operates according to a FIFO principle may refer to an interface that selects and removes from the buffer the earliest unread data to be written to the buffer.

Because a pipe may implement a FIFO-organized buffer, the pipe may also be said to have write and read interfaces that operate according to a FIFO principle. From a programmer's perspective, for a pipe that has a write interface that operates according to FIFO principle, a task that writes data to the pipe may not necessarily specify a particular location in the pipe in which to write the data. Instead, the pipe may append the data to be written to the end of any data that is already stored in the pipe. Similarly, for a pipe that has a read interface that operates according to FIFO principle, a task that reads data from the pipe may not necessarily specify a particular location in the pipe from which to read data. Instead, the pipe may select and return data stored in the pipe that was the earliest unread data to be written to the pipe. By providing read and write interfaces that operate according to a FIFO principle, a pipe may provide an abstract data structure by which producer and consumer tasks may efficiently communicate with each other without requiring programmers to be concerned with the internal organization of the memory that is used to store the data.

The pipes described in this disclosure may, in some examples, use data packets as the fundamental unit of data for writing and reading data to the pipe. A pipe that is not empty may contain a sequence of one or more packets. A starting packet for a pipe may refer to a packet that corresponds to a first packet in the sequence of packets that is stored in the pipe. An ending packet for a pipe may refer to a packet that corresponds to a last packet in the sequence of packets that is stored in the pipe. A pipe that is empty may not contain any packets.

A pipe may include a plurality of packet entries for storing data packets where each of the packet entries is capable of storing a single data packet. The sequence of packets for a non-empty pipe may be stored in a contiguous set of packet entries for the pipe. In some cases, the packet entries may be stored in a memory space and the contiguous set of packet entries may wrap around from the end of the memory space to the beginning of the memory space. A starting packet entry for a non-empty pipe may refer to a packet entry that stores the starting packet of the pipe. An ending packet entry for a non-empty pipe may refer to a packet entry that stores the ending packet of the pipe. A first packet offset parameter may be a value that is indicative of the starting packet entry for a non-empty pipe. For an empty pipe, the first packet offset parameter may be value that is indicative of a first packet entry to which data will be written when data is written to the pipe.

Various pipe implementations may use multiple state parameters to define the state of a pipe, and these state parameters may need to be modified each time a data producer or consumer interacts with the pipe. Because of the parallelism in a parallel computing system, a pipe may need to support multiple data producers and/or multiple data consumers that each may potentially attempt to interact with the pipe and modify the pipe state parameters at the same time. Allowing multiple data producers and/or consumers to modify multiple pipe state parameters at potentially the same time may lead to race conditions, which may prevent the pipe from functioning properly.

According to some aspects of this disclosure, techniques are described for performing hardware-based atomic operations to maintain the state of a pipe. For example, a hardware unit that is included in a processor may be configured to perform a hardware-based atomic read-modify-write operation that modifies two or more pipe state parameters that are indicative of a state of a pipe. Using a hardware-based atomic read-modify-write operation to modify two or more pipe state parameters in an atomic fashion may avoid race conditions that would otherwise occur when multiple data producers and/or consumers attempt to modify the state of a pipe at the same time. In this way, proper functionality may be achieved for pipes that use multiple state parameters to define the state of the pipe.

One example of a pipe that uses multiple state parameters to define the state of the pipe is a pipe that is implemented as a ring buffer (i.e., a circular buffer). A pipe that is implemented as a ring buffer may have pipe entries that are organized as a ring buffer. A ring buffer may refer to a data structure that uses a single, fixed-size buffer as if the buffer were connected end-to-end. In other words, the packet entries located at the opposite ends of the fixed-size buffer may conceptually be considered to be adjacent to each other for implementing the ring buffer.

Because a ring buffer does not have a fixed starting packet entry and a fixed ending packet entry, multiple state parameters are typically needed to completely define the state of a pipe that is implemented as a ring buffer. For example, a first packet offset parameter may point to the starting packet entry of the pipe and a packet count parameter may indicate the number of packets contained in the pipe. As another example, a first packet offset parameter may point to the starting packet entry of the pipe and a last packet offset parameter may point to a last packet entry of the pipe. Each time data is added to or removed from a pipe that is implemented as ring buffer, each of the state parameters may need to be updated. Therefore, multiple pipe state parameters may need to be updated when a pipe is implemented as a ring buffer.

Another example of a pipe that uses multiple state parameters to define the state of the pipe is a pipe that supports reservations. Pipe reservations may allow a producer thread to reserve and write to a contiguous set of packet entries in the pipe, and allow a consumer thread to reserve and read from a contiguous set of packet entries in the pipe. Pipe reservations may be used to alleviate interleaving problems that may arise when multiple producers attempt to write more than one packet to a pipe at the same time and/or multiple consumers attempt to read more than one packet from a pipe at the same time.

In general, the problem of multiple producers and/or multiple consumers attempting to write more than one packet to a pipe and/or read more than one packet from a pipe may arise in a context where a pipe supports multiple tasks being bound to the pipe as either producers or consumers. The problem may also arise in the context where a single task is bound to the pipe as a producer or consumer and the execution of the task is distributed to a plurality of threads (i.e., instances of the task) that are executed in parallel. This may occur, for example, in a parallel computing system that supports data-parallelism (e.g., a parallel computing system that includes a single instruction, multiple data (SIMD) execution unit and/or a single program, multiple data (SPMD) execution unit).

To use a pipe that supports reservations, a producer may reserve a contiguous set of packet entries in the pipe for writing, write packet data to the reserved packet entries, and commit the reserved packet entries to the pipe. Similarly, a consumer may reserve a contiguous set of packet entries in the pipe for reading, read the packet data from the reserved packet entries, and commit the reserved packet entries to the pipe.

Because multiple producers may reserve packet entries for the pipe at the same time and/or write to reserved packet entries at the same time, multiple write reservations may be outstanding (i.e., uncommitted) at a given time for the pipe. In such cases, the pipe may wait until all outstanding write reservations have been committed prior to updating the pipe state parameters to reflect that data packets have been written to the reserved packet entries of the pipe.

Similarly, because multiple consumers may reserve packet entries for the pipe at the same time and/or read from reserved packet entries at the same time, multiple read reservations may be outstanding (i.e., uncommitted) at a given time for the pipe. In such cases, the pipe may wait until all outstanding read reservations have been committed prior to updating the pipe state parameters to reflect that the data packets included in the reserved packet entries have been read and removed from the pipe.

To maintain the state of a pipe that supports reservations, one or more pipe state parameters may be needed to define the reservation state of the pipe. These pipe state parameters may be referred to as reservation state parameters. For example, a first reservation state parameter may be indicative of how many outstanding reservations there are for the pipe and a second reservation state parameter may be indicative of how many packet entries are reserved in the pipe. Each time packet entries are reserved and/or committed in a pipe, the reservation state parameters may need to be updated. In addition, when all outstanding reservations are committed to the pipe, the reservation state parameters and the other pipe state parameters may need to be updated. Therefore, multiple pipe state parameters may need to be updated when packet entries are reserved from and/or committed to a pipe that supports reservations.

As discussed above, when a pipe is organized as a ring buffer and/or when a pipe supports reservations, multiple pipe state parameters may be needed to define the state of the pipe. Because of the parallelism in a parallel computing system, a pipe may need to support multiple data producers and/or multiple data consumers that each may potentially attempt to interact with the pipe and modify the pipe state parameters at the same time. Allowing multiple data producers and/or consumers to modify multiple pipe state parameters at potentially the same time may lead to race conditions, which may prevent the pipe from functioning properly.

According to some aspects of this disclosure, techniques are described for performing hardware-based atomic operations to maintain the state of the pipe. For example, a hardware unit that is included in a processor may be configured to perform a hardware-based atomic read-modify-write operation that modifies two or more pipe state parameters that are indicative of a state of a pipe. Using a hardware-based atomic read-modify-write operation to modify two or more pipe state parameters in an atomic fashion may avoid race conditions that would otherwise occur when multiple data producers and/or consumers attempt to modify the state of a pipe at the same time. In this way, proper functionality may be achieved for pipes that use multiple state parameters, such as, e.g., pipes that are implemented as ring buffers and/or pipes that support reservations.

Another solution for avoiding race conditions when updating multiple pipe state parameters involves placing attempts by a thread to modify the state of a pipe into a critical section of compiled code for the thread, and using mutex locks to enforce the critical section of code. The mutex locks may ensure that no two threads are executing in their critical sections at the same time, thereby ensuring that two threads cannot modify the pipe state parameters at the same time. The mutex locks may be implemented by using, e.g., compare-exchange atomic operations. When mutex locks are used, however, many threads may compete for the lock, thereby resulting in multiple attempts being made for a successful acquire of the lock. The repeated attempts by the threads to acquire the lock may reduce performance and/or power efficiency.

The hardware-based atomic operations described in this disclosure, however, may ensure that two threads cannot modify the pipe state parameters of a pipe at the same time and may achieve such behavior without requiring the use of mutex locks. For example, when a hardware unit that implements the hardware-based atomic operations of this disclosure receives multiple requests from multiple threads to modify multiple pipe state parameters for a pipe, the hardware unit may sequentially process the requests such that all pipe state parameter modifications associated with a first request from a first thread are completed prior to performing any of the pipe state parameter modifications associated with a second request from a second thread. Using such a hardware unit may allow proper pipe functionality to be achieved in parallel computing systems where multiple concurrently executing threads attempt to modify multiple pipe state parameters at the same time. In this way, pipe-based inter-task communication may be provided in a parallel computing system without necessitating the performance drawbacks and/or power consumption drawbacks associated with using software-based, mutual exclusion techniques for modifying pipe state parameters.

In some examples, the hardware-based atomic operations described in this disclosure may include a hardware-based atomic read-modify-write operation that modifies two or more pipe state parameters that are indicative of a state of a pipe. A read-modify-write operation may be atomic in the sense that the operation is performed from start to end without interruption from any other read-modify-write operations that may be requested by other tasks and/or threads that are executing concurrently with the task or thread that requested the read-modify-write operation. In other words, during the performance of an atomic read-modify-write operation, no other threads and/or tasks may be able to read or modify the pipe state parameters that are modified by the read-modify-write operation. In this way, race conditions may be avoided in cases where two or more tasks and/or threads attempt to modify the pipe state parameters of a pipe at the same time.

An atomic read-modify-write operation may be hardware-based in the sense that the atomic read-modify-write operation may be implemented by a hardware unit as a single, indivisible operation which may be invoked by threads and/or tasks that are communicatively coupled to the hardware unit. The single, indivisible operation may be indivisible in the sense that the hardware unit performs the operation from start to finish without interrupting the operation to perform other read-modify-write operations that may be requested by other tasks and/or threads that are executing concurrently with the task or thread that requested the read-modify-write operation. For example, if the hardware unit receives multiple requests to perform an atomic read-modify-write operation, the hardware unit may sequentially perform the atomic read-modify-write operation for each of the requests such that one atomic read-modify-write operation is performed at a time, and such that the performance of each atomic read-modify-write operation is completed prior to starting to perform another atomic read-modify-write operation. By using hardware-based atomic read-modify-write operations, multiple pipe state parameters may be modified by concurrently executing tasks and/or threads without requiring the tasks and/or threads to use mutex locks.

In some examples, to perform a hardware-based atomic read-modify-write operation that modifies two or more pipe state parameters, a hardware unit may be configured to perform a non-interruptible set of operations. For example, the non-interruptible set of operations may include an operation that reads values that correspond to the pipe state parameters of a pipe from a memory subsystem, an operation that generates modified values for the pipe state parameters, and an operation that writes the modified values for the pipe state parameters to the memory subsystem. The set of operations may be non-interruptible in the sense that the operations are performed from start to finish without interrupting execution to perform other operations that may be associated with other read-modify-write operations (e.g., other read-modify write operations that are requested by tasks and/or threads that are executing concurrently with the task or thread that requested the currently executing read-modify-write operation). Causing a hardware unit to perform a non-interruptible read-modify-write sequence in this fashion allows the hardware unit to implement atomic read-modify-write operations for concurrently executing threads and/or tasks that may request such operations.

According to some aspects of this disclosure, a hardware unit that implements hardware-based atomic read-modify-write operations according to this disclosure may perform different modify operations for different pipe state parameters as part of a single, atomic read-modify-write operation. For example, a hardware unit may perform a first modify operation that generates a modified value for a first pipe state parameter based on a first modification function, and a second modify operation that generates a modified value for a second pipe state parameter based on a second modification function. The second modification function may be different than the first modification function. Using different modification functions to modify different pipe state parameters as part of a single, atomic read-modify-write operation may allow different pipe state parameters to be updated in different ways in a single atomic operation.

For example, to support an atomic pipe reservation operation, a first modification function may be used to increment a reserved packet count parameter by the number of packets that are requested for the pipe reservation, and a second modification function may be used to increment a reservation count by a constant value of one. As another example, to support an atomic pipe commit operation, a first modification function may be used to decrement a reservation count by a constant value of one, a second modification function may be used to increment or decrement a packet count parameter by the reservation count parameter, and a third modification function may be used to reset a reserved packet count parameter to zero. Other examples are possible and are within the scope of this disclosure.

According to additional aspects of this disclosure, a hardware unit that implements hardware-based atomic read-modify-write operations according to this disclosure may modify the value of one or more pipe state parameters based on the value of one or more additional pipe state parameters that are obtained from a memory subsystem during the performance of the atomic operation. For example, a hardware unit may, during a single read-modify-write operation, read first and second values that correspond, respectively, to first and second pipe state parameters of a pipe, and generate modified values for the first and second pipe state parameters such that the modified value for the second pipe state parameter is generated based on the first value that corresponds to the first pipe state parameter. Modifying a pipe state parameter value based on a different pipe state parameter value during a single, atomic read-modify-write operation may allow pipe state parameters to be updated in a single atomic operation based on the current state of the pipe.

For example, to support an atomic commit operation, a packet count parameter may be decremented or incremented by a reserved packet count parameter depending on whether the commit operation is a read commit operation or a write commit operation. As another example, to support an atomic commit read operation, a first packet offset parameter may be adjusted based on a reserved packet count parameter. Other examples are possible and are within the scope of this disclosure.

According to additional aspects of this disclosure, modifying a pipe state parameter value based on a different pipe state parameter value may involve conditionally updating the pipe state parameter value based on a different pipe state parameter value. Conditionally updating a pipe state parameter value may involve determining whether to update or not update the pipe state parameter value based on a different pipe state parameter value. Conditionally updating a pipe state parameter value based other pipe state parameter values may allow pipe state parameters to be updated or not updated based on the current state of the pipe.

According to additional aspects of this disclosure, a hardware unit that implements hardware-based atomic read-modify-write operations according to this disclosure may return pipe state parameter values to a requesting thread and/or task. In some cases, the returned pipe state parameter values may reflect the state of the pipe prior to the modifications that are performed by the hardware-based atomic read-modify-write operation. Returning values to the requesting thread and/or task may allow the thread or task to determine which packet entries have been reserved for a reservation operation and where the reserved packet entries are located in a memory space that stores the packet entries for the pipe.

In some examples, the hardware-based atomic read-modify-write operations of this disclosure may include an atomic reserve write operation. An atomic reserve write operation may determine whether a pipe has enough uncommitted and unreserved entries to support a write reservation request based on one or more of the pipe state parameters. In response to determining that the pipe has enough uncommitted and unreserved entries to support the write reservation request, the atomic reserve write operation may generate modified values for the pipe state parameters such that the modified values reflect that a write reservation has been made for the pipe.

In further examples, the hardware-based atomic read-modify-write operations of this disclosure may include an atomic reserve read operation. The atomic reserve read operation may determine whether the pipe has enough unread and unreserved packet entries in which packet data is stored to support a read reservation request based on one or more of the pipe state parameters. In response to determining that the pipe has enough unread and unreserved packet entries in which packet data is stored to support the read reservation request, the atomic reserve read operation may generate modified values for the pipe state parameters such that the modified values reflect that a read reservation has been made for the pipe.

In additional examples, the hardware-based atomic read-modify-write operations of this disclosure may include an atomic commit write operation. The atomic commit write operation may generate a modified value for a first pipe state parameter such that the modified value reflects that the pipe has one less uncommitted reservation relative to how many uncommitted reservations the pipe had prior to performing the atomic commit write operation. The atomic commit write operation may further determine whether all reservations for the pipe have been committed based on one or more of the pipe state parameters. In response to determining that all reservations for the pipe have been committed, the atomic commit write operation may generate one or more modified values for the pipe state parameters such that the modified values reflect that committed entries have been placed into the pipe.

In further examples, the hardware-based atomic read-modify-write operations of this disclosure may include an atomic commit read operation. The atomic commit read operation may generate a modified value for a first pipe state parameter such that the modified value reflects that the pipe has one less uncommitted reservation relative to how many uncommitted reservations the pipe had prior to performing the atomic commit read operation. The atomic commit read operation may further determine whether all reservations for the pipe have been committed based on one or more of the pipe state parameters. In response to determining that all reservations for the pipe have been committed, the atomic commit read operation may generate one or more modified values for the pipe state parameters such that the modified values reflect that committed entries have been removed from the pipe.

According to additional aspects of this disclosure, the number of bits used to store the multiple pipe state parameters that are read and written during a single, atomic read-modify-write operation may be the less than or equal to the number of bits included in a block of data that is read from or written to a data storage unit during a single memory transaction. For example, the number of bits used to store the multiple pipe state parameters may be less than or equal to the number of bits in a memory word and/or the number of bits in a cache line. In some cases, the pipe state parameters for each of the pipes stored in a memory subsystem may be aligned such that all of the pipe state parameters for a pipe are stored in a single memory word and/or a single cache line of a memory subsystem. In this way, an atomic read-modify-write operation may be able to modify multiple pipe state parameters without requiring more than one memory read transaction or more than one memory write transaction.

In some examples, the pipe state parameters that define the state of a pipe may include a packet count parameter indicative of how many packets are currently stored in the pipe, and a first packet offset parameter indicative of a packet entry that stores a starting packet for the pipe. These parameters may be used to define the state of a pipe that is implemented as a ring buffer.

In further examples, the pipe state parameters that define the state of a pipe may include a reservation count parameter indicative of how many uncommitted reservations are currently pending for the pipe, and a reserved packet count parameter indicative of how many packet entries are currently reserved in the pipe. These parameters may be referred to as reservation state parameters and may be used to define the state of a pipe that supports reservations.

In additional examples, the pipe state parameters that define the state of a pipe may include a packet count parameter, a first packet offset parameter, a reservation count parameter, and a reserved packet parameter. This combination of pipe state parameters may be used to define the state of a pipe that supports reservations and that is implemented as a ring buffer.

Although the hardware-based atomic read-modify-write operations of this disclosure are primarily described with respect to the modification of pipe state parameters, it should be understood that the same or similar types of operations may be applied to different types of data. In general, the hardware-based atomic read-modify-write operations of this disclosure may be used, for example, in applications where two or more values need to be modified in an atomic fashion as part a single operation. Using hardware-based atomic read-modify-write operations to modify two or more values in an atomic fashion may allow concurrently executing tasks and/or threads to modify shared objects without requiring the use of locks and/or critical sections of code.

FIG. 1 is a block diagram illustrating an example computing system 10 that implements the hardware-based atomic operations of this disclosure. Computing system 10 may be configured to execute one or more tasks. A task may refer to a computer program that is executed by computing system 10. In some examples, computing system 10 may be a parallel computing system. For example, computing system 10 may execute two or more tasks in parallel on different compute units. As another example, for one or more tasks, computing system 10 may execute a plurality of instances of the respective task in parallel. A thread may refer to an instance of a task that is executed by a single processing element in computing system 10.

Computing system 10 includes compute units 12A-12B (collectively, "compute units 12"), an atomic operations unit 14, and a data storage system 16. As shown in FIG. 1, compute units 12 are communicatively coupled to atomic operations unit 14, and atomic operations unit 14 is communicatively coupled to data storage system 16. Compute units 12 may be communicatively coupled to data storage system 16 indirectly via atomic operations unit 14. Although not specifically shown in FIG. 1, compute units 12 may, in some examples, be communicatively coupled directly to data storage system 16 in addition to being indirectly coupled to data storage system 16.

Compute units 12 are configured to execute one or more tasks. In some cases, compute units 12 may execute the tasks in parallel. Each of compute units 12 may execute the same task or different tasks. The tasks executed by compute units 12 may exploit data-parallelism. Therefore, the execution of a task may be distributed to a plurality of threads (i.e., instances of the task) where each of the threads executes the same program/task with respect to different data. The plurality of threads may be executed in thread groups where, for each thread group, the threads are executed in parallel. As such, each of compute units 12 may execute one task at a given point in time, but may execute a plurality of instances of the task (i.e., threads) at the same time. The threads may be alternatively referred to as work-items, and the thread groups may be alternatively referred as work-groups.

As shown in FIG. 1, compute units 12 are configured to execute one or more threads. For example, compute unit 12A is configured to execute threads 18A, 18B, and compute unit 12B is configured to execute threads 20A, 20B.

Each of compute units 12 may include one or more processing elements. Each of the processing elements in compute units 12 may execute a single thread. In examples where one or more of compute units 12 includes multiple processing elements, the processing elements in a single one or compute units 12 may collectively be configured to execute a group of threads (e.g., work-group) in parallel, and each of the processing elements may execute a respective one of the threads in a group of threads (i.e., work-group). In some examples, each of compute units 12 may also include one or more of a local memory, an instruction store, a constant memory, etc.

In some examples, the processing units in a single one of compute units 12 may collectively implement a single instruction, multiple data (SIMD) processor and/or a single program, multiple data (SPMD) processor. Both types of processors may concurrently execute a plurality of instances of a task on multiple processing elements. In a SIMD processor, all active processing elements may execute identical instructions during a given instruction cycle with respect to different data, and each of the processing elements may share a common program counter. In a SPMD processor, all processing elements may execute an identical program with respect to different data, and each of the processing elements may have its own program counter. For a SPMD processor, the processing elements may execute different instructions of the same program at the same time.

Each of compute units 12 may be a programmable compute unit. A compute unit may be programmable in the sense that the compute unit may include hardware that is configured to execute a program or task. In contrast, non-programmable or fixed-function hardware may refer to hardware that is not configured to execute programs. Although fixed-function hardware may be configurable, the configurability of the hardware is based on one or more control signals received by the fixed-function hardware as opposed to being based on a user-defined program that is executed by the hardware.

In some examples, one or both of compute units 12 may operate according to a parallel programming application programming interface (API), a heterogeneous computing platform API, and/or a co-processor computing platform API, such as, for example, an Open Computing Language (OpenCL™) API. In further examples, one or both of compute units 12 may correspond to an OpenCL™ compute unit defined according to the OpenCL™ specification. Further details regarding the OpenCL™ API can be found in "The OpenCL Specification," Version: 2.0, Document Revision 19, Khronos OpenCL Working Group, Nov. 14, 2013; "The OpenCL C Specification," Version: 2.0, Document Revision 19, Khronos OpenCL Working Group, Nov. 14, 2013; and "The OpenCL Extension Specification," Version: 2.0, Document Revision 19, Khronos OpenCL Working Group, Nov. 14, 2013.

In some examples, each of compute units 12 may be included in one or more processing units. The processing units may include, for example, a central processing unit (CPU), a multi-core CPU, a graphics processing unit (GPU), a digital signal processor (DSP), a Cell Broadband Engine (Cell/B.E.) processor, a parallel processor, a co-processor, etc. In some examples, a processing unit may be a compute device in a heterogeneous computing platform, a parallel processing computing platform, and/or a co-processor computing platform. In further examples, the processing unit may correspond to a device and/or compute device defined according to the OpenCL™ specification.

In some examples, each of compute units 12 may be included in the same processing unit and/or compute device. For example, each of compute units 12 may be included in a single graphics processing unit (GPU). In further examples, each of compute units 12 may be included in different processing units and/or compute devices. For example, compute unit 12A may be included in a GPU, and compute unit 12B may be included in a multi-core CPU.

In examples where one or both of compute units 12 are included in a GPU, each of compute units 12 may, in some examples, correspond to a respective shader unit of the GPU. A shader unit of a GPU may be configured to execute shader programs, such as, e.g., graphics-specific shader programs and/or general-purpose shader programs (e.g., compute shader programs).

In some examples, the programs or tasks executed by compute units 12 together with a host program may form a computing application. The host program may execute on the same processing unit as one or more of the processing units that include compute units 12 or on a different processing unit. The processing unit that executes the host program may be referred to as a host device. An example configuration for executing a computing application may include a CPU and a GPU where the CPU executes the host program and the GPU includes compute units 12 which execute the tasks and/or threads.

In examples where the tasks executed by compute units 12 are part of a computing application that includes a host program, the program code for the tasks executed by compute units 12 may be provided by the host program. In some cases, the host processor may load the program code for the tasks into on-chip memory included in compute units 12 and/or into on-chip memory of one or more processing units that include compute units 12 so that compute units 12 may more efficiently execute the tasks. In some examples, the host program may map threads corresponding to a task to work-groups and processing elements within the work-groups, and invoke execution of the task on a computing device that include one or both of compute units 12. A control unit included in the processing unit (e.g., compute device) of which one or both of compute units 12 are a part may assign particular work-groups to particular ones of compute units 12 for execution.

The example computing system 10 of FIG. 1 is illustrated as including two compute units 12 that each executes two threads for exemplary purposes. Other example computing systems that implement the techniques of this disclosure may have the same or a different number of compute units, and may execute the same number or a different number of threads. The number of threads concurrently executed by each of the compute units may be the same or different. In some examples, a computing system that implements the techniques of this disclosure may have a single compute unit. In further examples, a computing system that implements the techniques of this disclosure may have one or more compute units that execute a single thread.

Atomic operations unit 14 may be configured to perform the hardware-based atomic operations described in this disclosure. In some examples, atomic operations unit 14 may perform one or more hardware-based atomic read-modify-write operations that maintain the state of a pipe. For example, atomic operations unit 14 may perform a hardware-based atomic read-modify-write operation that modifies two or more pipe state parameters that are indicative of a state of a pipe where the pipe corresponds to a FIFO-organized data buffer for supporting inter-task communication. In some examples, the hardware-based atomic read-modify-write operations may include a read reserve operation, a write reserve operation, a read commit operation, and a write commit operation.

Atomic operations unit 14 may receive commands to perform various atomic operations from one or more of compute units 12, and process the commands. In some examples, atomic operations unit 14 may process the commands sequentially to ensure atomicity of the atomic operations. In other words, atomic operations unit 14 may process a single command from start to finish prior to processing a subsequent command. In some examples, the commands may include an atomic reserve read command, an atomic reserve write command, an atomic commit read command, and an atomic commit write command.

Atomic operations unit 14 may interact with data storage system 16 when performing the atomic read-modify-write operations. For example, atomic operations unit 14 may issue read requests and write requests to data storage system 16 in order to perform the read and write components of the atomic read-modify-write operations.

In some examples, atomic operations unit 14 may return one or more pipe state parameters in response to processing an atomic command. For example, as part of a reservation operation, atomic operations unit 14 may return one or more pipe state parameters to the requesting task. In other examples, atomic operations unit 14 may not return any data in response to executing an atomic command.

Atomic operations unit 14 may be a hardware unit that is implemented on one or more processors. The hardware unit may include circuitry for implementing the functionality attributed by this disclosure to atomic operations unit 14. For example, the hardware unit may, in some examples, include one or more of digital circuitry, analog circuitry, arithmetic logic units (ALUs), datapaths, etc.

In some examples, atomic operations unit 14 may be a fixed-function (i.e., non-programmable) hardware unit. In other words, atomic operations unit 14 may, in such examples, not necessarily be configured to receive and execute user-specified programs.

Atomic operations unit 14 may be implemented on a same processing unit or on a different processing unit than one or both of compute units 12. In some examples, atomic operations unit 14 may be included in a graphics processing unit (GPU) that also includes one or both of compute units 12. In further examples, atomic operations unit 14 may be included in a device and/or compute device that is included in a heterogeneous computing platform, a parallel processing computing platform, and/or a co-processor computing platform (e.g., a device and/or compute device defined according to the OpenCL™ specification).

In some examples, atomic operations unit 14 may be included in a memory subsystem that includes all or part of data storage system 16. For example, atomic operations unit 14 may be part of a cache unit of a processing unit (e.g., a cache unit of a GPU). In additional examples, atomic operations unit 14 may be integrated into a portion of a memory subsystem that is associated with a device and/or compute device that is included in a heterogeneous computing platform, a parallel processing computing platform, and/or a co-processor computing platform (e.g., a device and/or compute device defined according to the OpenCL™ specification).

Data storage system 16 may be configured to store data indicative of the state and contents of a pipe to be used for inter-task communication. Data storage system 16 includes pipe state parameters 22 and a pipe data buffer 24. Data storage system 16 may include one or more data storage units, such as, e.g., volatile memory, non-volatile memory, a cache, random access memory (RAM), static RAM (SRAM), dynamic RAM (DRAM), etc.

In some examples, data storage system 16 may include a single storage unit, such as a memory storage unit. The memory storage unit may be on-chip memory that is located on a processing unit that includes compute units 12 or an off-chip memory that is external to a processing unit that includes compute units 12.

In further examples, data storage system 16 may include multiple storage units. For example, data storage system 16 may include a cache storage unit and an underlying memory storage unit. The underlying memory storage unit may store a source copy of pipe state parameters 22 and/or pipe data buffer 24, and the cache storage unit may store a cached copy of pipe state parameters 22 and/or pipe data buffer 24. The cached copy may be an incomplete version of the source copy.

In examples where data storage system 16 includes a cache storage unit and an underlying memory storage unit, the cache storage unit may, in some examples, be an on-chip cache and the underlying memory storage unit may be an off-chip memory storage unit. In other words, the cache storage unit may be located on a processing unit that includes compute units 12 or and the memory storage unit may be external to a processing unit that includes compute units 12.

Pipe state parameters 22 are indicative of a state of a pipe. Pipe state parameters 22 may include one or more of a packet count parameter that is indicative of how many packets are currently stored in the pipe, a first packet offset parameter that is indicative of a packet entry that stores a starting packet for the pipe, a reservation count parameter that is indicative of how many uncommitted reservations are currently pending for the pipe, and a reserved packet count parameter that is indicative of how many packet entries are currently reserved in the pipe.

The packet count parameter and the first packet offset parameter may be used, for examples, to define the state of a pipe that is implemented as a ring buffer. The reservation count parameter and the reserved packet count parameter may be used, for example, to define the reservation state of a pipe that supports reservation.

The pipe state parameters 22 described above are merely examples of a set of pipe state parameters that may be used with the techniques of this disclosure. In other examples, the same number or a different number of pipe state parameters may be used and the type of pipe state parameters used may be the same or different.

Pipe data buffer 24 may include a plurality of packet entries that are configured to store data packets that correspond to the data content of a pipe. For a non-empty pipe, pipe data buffer 24 may include a sequence of packets that is stored in a contiguous set of packet entries. In some cases, the contiguous set of packet entries may wrap around from the end of pipe data buffer 24 to the beginning of pipe data buffer 24. For an empty pipe, each of the packet entries in pipe data buffer 24 may be empty.

In some examples, pipe data buffer 24 may be organized as a ring buffer. A ring buffer may refer to a data structure that uses a single, fixed-size buffer as if the buffer were connected end-to-end. In other words, the packet entries located at the opposite ends of pipe data buffer 24 may conceptually be considered to be adjacent to each other for implementing the ring buffer.

Pipe state parameters 22 and pipe data buffer 24 may be used to implement a FIFO-organized buffer. A FIFO-organized buffer may refer to a buffer where the write interface and the read interface operate according to a FIFO principle. A write interface that operates according to a FIFO principle may refer to an interface that appends data to be written to the end of any data that is already stored in the buffer. A read interface that operates according to a FIFO principle may refer to an interface that selects and removes from the buffer the earliest unread data to be written to the buffer.

In some examples, all or part of one or more of compute units 12, atomic operations unit 14, and data storage system 16 may be part of a same processor unit. For example, compute units 12, atomic operations unit 14, and a cache unit that corresponds to part of data storage system 16 may all be included in a GPU. In this example, an underlying memory storage unit may be included in an off-chip memory that is not located on the same chip as GPU.

In examples where atomic operations unit 14 is part of a computing device, if compute unit 12A and compute unit 12B are part of different computing devices, then each computing device may include an atomic operations unit 14. In such examples, instead of both compute unit 12A and compute unit 12B being communicatively coupled to a single atomic operations unit 14, as shown in FIG. 1, compute unit 12A and compute unit 12B may be communicatively coupled to their respective atomic operations units in their respective computing devices.

The operation of computing system 10 will now be described. In the example operation described below, a pipe (e.g., pipe state parameters 22 and pipe data buffer 24) has already been allocated in data storage system 16, and the execution of a task has been invoked on each of compute units 12 such that threads 18A, 18B are concurrently executing on compute unit 12A and threads 20A, 20B are concurrently executing on compute unit 12B.

One or more of threads 18, 20 issues an atomic operation command to atomic operations unit 14. Atomic operations unit 14 executes the atomic operation command. For example, atomic operations unit 14 may perform an atomic operation that corresponds to the atomic operation command.

The atomic operation performed by atomic operations unit 14 may be an atomic read-modify-write operation that reads, modifies, and writes two or more pipe state parameters in an atomic fashion. To perform an atomic read-modify-write operation, atomic operations unit 14 may perform a non-interruptible set of operations. The non-interruptible set of operations may include an operation that reads values that correspond to pipe state parameters 22 from data storage system 16, an operation that generates modified values for pipe state parameters 22, and an operation that writes the modified values for pipe state parameters 22 to data storage system 16.

To perform the read operation, atomic operations unit 14 may issue a read request to data storage system 16. Data storage system 16 may provide pipe state parameters 22 to atomic operations unit 14. In some examples, all pipe state parameters 22 for a pipe may be provided in response to a single read request. In additional examples, all pipe state parameters 22 for a pipe may be provided as part of a single read cycle. In further examples, all pipe state parameters 22 may form a single data word that is ready during a single memory transaction. To perform the modify operation, atomic operations unit 14 may use one or more datapaths. The data paths may include, for example, one or more ALUs. To perform the write operation, atomic operations unit 14 may issue a write request to data storage system 16, and provide the modified values for pipe state parameters 22 to data storage system 16.

Atomic operations unit 14 may modify the received pipe state parameter values based on the type of atomic operation being performed. Example types of atomic operations include an atomic reserve read operation, an atomic reserve write operation, an atomic commit write operation, and an atomic commit read operation.

In some examples, after performing the read operation, atomic operations unit 14 may perform a return operation that returns one or more of the pipe state parameter values that were read from data storage system 16 to the requesting thread that issued the command. The returned values may correspond to the state of the pipe immediately prior to performing the atomic read-modify-write operation.

Atomic operations unit 14 may perform different types of atomic read-modify write operations based on the type of atomic operation command received from compute units 12. For example, atomic operations unit 14 may perform an atomic reserve write operation in response to receiving an atomic reserve write command from compute units 12, perform an atomic reserve read operation in response to receiving an atomic reserve read command from compute units 12, perform an atomic commit write operation in response to receiving an atomic commit write command from compute units 12, and/or perform an atomic commit read operation in response to receiving an atomic commit read command from compute units 12.

The atomic commands may be alternatively referred to herein as requests, and the thread that issues the command may be alternatively referred to herein as the requester. For example, when thread 18A issues a reserve write command to atomic operations unit 14, thread 18A may be said to be a requester that issues a write reservation request.

An example use case for the atomic operations and atomic commands described in this disclosure will now be described. An application programming interface (API) may provide support for pipes that allow for inter-task communication in a computing environment where multiple tasks and/or threads may execute concurrently. To avoid interleaving in the pipe, the API may allow contiguous sets of packet entries in the pipe to be reserved by threads for reading or writing. Such a pipe may be said to support reservations.

To support reservations, an API may provide reserve pipe commands, read and write pipe commands, and commit pipe commands. These commands may be placed into the source code by a programmer and/or other source code generator to allow a task and/or thread to write to and read from a pipe.

From a programmer's perspective, the general sequence of operations used to write data to a pipe may be the following: reserve packet entries for writing, write data to the reserved packet entries, and commit the reserved packet entries to the pipe. To perform, the above-mentioned sequence of operations for writing data to a pipe, a write sequence of commands may be placed into the source code. The write sequence of commands may include a reserve write pipe command, a write pipe command, and a commit write pipe command. In some examples, the commands in the above-mentioned write sequence of commands may correspond, respectively, to a reserve_write_pipe command, a writepipe command, and a commit_write_pipe as defined according to the OpenCL™ specification.

The reserve write pipe command may reserve a requested number of packet entries in a pipe for writing, and return data indicative of the reservation (e.g., a reservation handle). The write pipe command may write data (e.g., packets) to the reserved packet entries indicated by the reservation handle. The commit write pipe command may commit the reserved packet entries to the pipe. Committing the reserved packet entries to the pipe may indicate that the producer task has finished writing data to the reserved packet entries of the pipe, and that such packet entries are ready to be made available to a consumer task.

From a programmer's perspective, the general sequence of operations used to read data from a pipe may be the following: reserve packet entries for reading, read data from the reserved packet entries, and commit the reserved packet entries to the pipe. To perform, the above-mentioned sequence of operations for reading data from a pipe, a read sequence of commands may be placed into the source code. The read sequence of commands may include a reserve read pipe command, a read pipe command, and a commit read pipe command. In some examples, the commands in the above-mentioned read sequence of commands may correspond, respectively, to a reserve_read_pipe command, a readpipe command, and a commit_read_pipe as defined according to the OpenCL™ specification.

The reserve read pipe command may reserve a requested number of packet entries for reading, and return data indicative of the reservation (e.g., a reservation handle). The read pipe command may read data (e.g., packets) from the reserved packet entries indicated by the reservation handle. The commit read pipe command may commit the reserved packet entries to the pipe. Committing the reserved packet entries to the pipe may indicate that the consumer task has finished reading the data from the reserved packet entries of the pipe, and that such packet entries may be cleared and/or removed from the pipe.

The read and write sequences of commands discussed above (which includes the reserve pipe and commit pipe commands) may be source code-level commands. A compiler may compile the source code-level commands to generate compiled code that includes compiled code-level commands. The compiled code-level commands may include the atomic reserve commands and atomic commit commands described in this disclosure.

Example operation of computing system 10 will now be described for cases where one of threads 18, 20 uses pipe reservations to write data to a pipe and uses pipe reservations to read data from a pipe. In this example, each of threads 18, 20 may execute compiled code that includes the atomic reserve and atomic commit commands of this disclosure.

For purposes of this explanation, thread 18A will be described as writing data to the pipe and thread 20A will be described as reading data from the pipe. However, in other examples, any of threads 18, 20 may write data to and read data from the pipe in a similar fashion.

To write data to a pipe, thread 18A may issue an atomic reserve write command to atomic operations unit 14. The atomic reserve write command may include one or both of a parameter indicative of the pipe to which data is to be written and a parameter indicative of the requested number of packet entries to be reserved for writing. The parameter indicative of the pipe to which data is to be written may, in some examples, be a pipe address parameter. For example, the pipe address parameter may be a memory address that corresponds to a location in a memory subsystem (e.g., data storage system 16) where pipe state parameters 22 are stored for a particular pipe that is being accessed. A pipe address parameter may be used to identify which pipe to modify in data storage system 16 when data storage system 16 contains data for more than one pipe, and to identify the location in data storage system 16 where the pipe data is stored.

In response to receiving the atomic reserve write command, atomic operations unit 14 may perform an atomic reserve write operation. The atomic reserve write operation may be an example of atomic read-modify-write operation that modifies two or more pipe state parameters as described in this disclosure.

To perform the atomic reserve write operation, atomic operations unit 14 may obtain the pipe state parameters from data storage system 16, and return one or more of the pipe state parameters that are obtained from data storage system 16 to thread 18A. In some examples, the pipe state parameters returned by atomic operations unit 14 may include a first packet offset parameter, a packet count parameter, and a reserved packet count parameter.

Atomic operations unit 14 may further determine whether a pipe has enough uncommitted and unreserved entries to support a write reservation request based on one or more of the pipe state parameters. In response to determining that the pipe has enough uncommitted and unreserved entries to support the write reservation request, atomic operations unit 14 may generate modified values for the pipe state parameters such that the modified values reflect that a write reservation has been made for the pipe. In response to determining that the pipe does not have enough uncommitted and unreserved entries to support the write reservation request, atomic operations unit 14 may generate modified values for the pipe state parameters such that the modified values are equal to the previous values for the pipe state parameters (i.e., such that the modified values reflect that a write reservation has not been made for the pipe).

After determining the modified values for the pipe state parameters, atomic operations unit 14 may write the modified values for the pipe state parameters 22 to data storage system 16. The functionality attributed to the atomic reserve write command may, in some examples, be performed as part of a non-interruptible set of operations. In other words, atomic operations unit 14 may perform the functionality attributed to the atomic reserve write command from start to finish without interrupting execution to perform other operations that may be associated with other atomic operation commands (e.g., other atomic operation commands that are issued by tasks and/or threads that are executing concurrently with the task or thread that issued the atomic reserve write command). Performing a non-interruptible set of operations in this fashion allows atomic operations unit 14 to implement an atomic reserve write command that ensures proper functionality of a pipe even in cases where concurrently executing threads and/or tasks may attempt to reserve the pipe for writing at the same time. Further details regarding an example implementation of an atomic reserve write command are described below with respect to FIG. 2.

Thread 18A may determine whether the write reservation was successful based on the returned pipe state parameters. To determine whether the write reservation was successful, thread 18A may, in some examples, determine whether the pipe has enough uncommitted and unreserved entries to support the write reservation request based on the returned pipe state parameters in a manner similar to how atomic operations unit 14 may make the same determination as discussed in further detail below. The returned pipe state parameters may be indicative of the state of the pipe prior to the performance of the reserve write operation.

If the write reservation was not successful, thread 18A may not write data to the pipe or commit data to the pipe in response to completion of the write reserve operation. In some examples, if the write reservation was not successful, thread 18A may terminate execution with an error condition. In further examples, if the write reservation was not successful, thread 18A may perform one or more operations to handle the condition. For example, thread 18A may stop attempting to perform a write reservation and continue performing other operations. As another example, thread 18A may attempt to repeat the write reserve operation after a period of time. This may allow a consumer thread time to read one or more packets from the pipe, thereby freeing up additional packet entries that can be reserved in a subsequent write reserve operation.

If the write reservation was successful, thread 18A may determine the physical packet entries of pipe data buffer 24 in which to write the data based on the one or more pipe state parameters that were returned by atomic operations unit 14 when processing the atomic write reserve command. In examples where thread 18A receives a first packet offset parameter, a packet count parameter, and a reserved packet count parameter, thread 18A may determine the first physical packet entry of pipe data buffer 24 in which to write data, for example, by adding the values of each of these parameters together. Thread 18A may write data to the determined first physical packet entry and the following packet entries up to the number of packet entries that were reserved. If the end of pipe data buffer 24 is reached before the reserved number of packet entries is written, thread 18A may wrap around to the beginning of pipe data buffer 24 to write to additional physical packet entries.

To write data to the reserved packet entries in pipe data buffer 24, thread 18A may, in some examples, determine a physical memory address for one or more of the packet entries based on a pipe address that is associated with the pipe to be written and based on the determined physical packet entries in which to write data and/or based on the returned pipe state parameters. In some examples, the pipe address may be provided to thread 18A by a host program that allocated the pipe in data storage system 16. In such examples, the pipe address may, in some examples, be stored in an on-chip constant memory of compute unit 12A. For example, a host program executing on a host processor may, in some examples, provide the pipe address as an argument to a function that invokes the execution of thread 18A on compute unit 12A (e.g., the constant parameters may be provided as kernel arguments to thread 18A).

In some examples, thread 18A may issue one or more memory write requests to data storage system 16 to write the packet data to the reserved packet entries contained in data storage system 16. Each of write requests may specify the physical location (e.g., memory addresses) in data storage system 16 in which to write the data and the data to be written. The write requests may collectively write packet data to all of the reserved packet entries.

Thread 18A may, in some examples, issue the memory write requests directly to data storage system 16 and/or a memory subsystem that includes data storage system 16. In other words, in such examples, computing system 10 may include a communication interface between compute unit 12A and data storage system 16 that bypasses atomic operations unit 14, and thread 18A may issue the memory write requests to data storage system 16 via that communication interface such that the memory write requests are received by data storage system 16 but do not pass through atomic operations unit 14.

After the packet data has been written to the reserved packet entries in pipe data buffer 24, atomic operations unit 14 may issue an atomic commit write command to atomic operations unit 14. The atomic commit write command may indicate that thread 18A has finished writing data to the reserved packet entries of the pipe, and that such packet entries are ready to be made available to a consumer task.

The atomic commit write command may include a parameter indicative of the pipe to which data was written. The parameter indicative of the pipe to which data was written may, in some examples, be a pipe address parameter. For example, the pipe address parameter may be a memory address that corresponds to a location in a memory subsystem (e.g., data storage system 16) where pipe state parameters 22 are stored for a particular pipe that is being accessed. A pipe address parameter may be used to identify which pipe to modify in data storage system 16 when data storage system 16 contains data for more than one pipe, and to identify the location in data storage system 16 where the pipe data is stored.

In response to receiving the atomic commit write command, atomic operations unit 14 may perform an atomic commit write operation. The atomic commit write operation may be an example of atomic read-modify-write operation that modifies two or more pipe state parameters as described in this disclosure.

To perform the atomic commit write operation, atomic operations unit 14 may obtain the pipe state parameters from data storage system 16. Unlike the atomic reserve write operation, atomic operations unit 14 may, in some examples, not return any pipe state parameters that are obtained from data storage system 16 to thread 18A when performing the atomic commit write operation.

Atomic operations unit 14 may generate a modified value for a first pipe state parameter such that the modified value reflects that the pipe has one less uncommitted reservation relative to how many uncommitted reservations the pipe had prior to performing the atomic commit write operation. In some examples, the first pipe parameter may be a reservation count parameter, and atomic operations unit 14 may decrement the reservation count parameter to reflect that the pipe has one less uncommitted reservation relative to how many uncommitted reservations the pipe had prior to performing the atomic commit write operation.

Atomic operations unit 14 may further determine whether all reservations for the pipe have been committed based on one or more of the pipe state parameters. In response to determining that all reservations for the pipe have been committed, atomic operations unit 14 may generate one or more modified values for the pipe state parameters such that the modified values reflect that committed entries have been placed into the pipe. In some examples, atomic operations unit 14 may increment a packet count parameter by an amount equal to a reserved packet count parameter, and may reset the reserved packet count parameter to zero in order to reflect that committed entries have been placed into the pipe. In response to determining that all reservations for the pipe have not been committed, atomic operations unit 14 may generate modified values for the pipe state parameters other than the first pipe state parameter (e.g., the reservation count parameter) such that the modified values are equal to the previous values for the pipe state parameters.

After determining the modified values for the pipe state parameters, atomic operations unit 14 may write the modified values for the pipe state parameters 22 to data storage system 16. The functionality attributed to the atomic commit write command may, in some examples, be performed as part of a non-interruptible set of operations. In other words, atomic operations unit 14 may perform the functionality attributed to the atomic commit write command from start to finish without interrupting execution to perform other operations that may be associated with other atomic operation commands (e.g., other atomic operation commands that are issued by tasks and/or threads that are executing concurrently with the task or thread that issued the atomic commit write command). Performing a non-interruptible set of operations in this fashion allows atomic operations unit 14 to implement an atomic commit write command that ensures proper functionality of a pipe even in cases where concurrently executing threads and/or tasks may attempt to commit written packet entries to the pipe at the same time. Further details regarding an example implementation of an atomic commit write command are described below with respect to FIG. 3.

To read data from a pipe, thread 20A may issue an atomic reserve read command to atomic operations unit 14. The atomic reserve read command may include one or both of a parameter indicative of the pipe from which data is to be read and a parameter indicative of the number of packet entries to be reserved for reading. The parameter indicative of the pipe from which data is to be read may, in some examples, be a pipe address parameter. For example, the pipe address parameter may be a memory address that corresponds to a location in a memory subsystem (e.g., data storage system 16) where pipe state parameters 22 are stored for a particular pipe that is being accessed. A pipe address parameter may be used to identify which pipe to access in data storage system 16 when data storage system 16 contains data for more than one pipe, and to identify the location in data storage system 16 where the pipe data is stored.

In response to receiving the atomic reserve read command, atomic operations unit 14 may perform an atomic reserve read operation. The atomic reserve read operation may be an example of atomic read-modify-write operation that modifies two or more pipe state parameters as described in this disclosure.

To perform the atomic reserve read operation, atomic operations unit 14 may obtain the pipe state parameters from data storage system 16, and determine whether a pipe has enough unread and unreserved packet entries in which packet data is stored to support a read reservation request based on one or more of the pipe state parameters. In response to determining that the pipe has enough unread and unreserved packet entries in which packet data is stored to support the read reservation request, atomic operations unit 14 may generate modified values for the pipe state parameters such that the modified values reflect that a read reservation has been made for the pipe. In response to determining that the pipe does not have enough unread and unreserved packet entries in which packet data is stored to support the read reservation request, atomic operations unit 14 may generate modified values for the pipe state parameters such that the modified values are equal to the previous values for the pipe state parameters (i.e., such that the modified values reflect that a read reservation has not been made for the pipe).

After determining the modified values for the pipe state parameters, atomic operations unit 14 may write the modified values for the pipe state parameters 22 to data storage system 16. The functionality attributed to the atomic reserve read command may, in some examples, be performed as part of a non-interruptible set of operations. In other words, atomic operations unit 14 may perform the functionality attributed to the atomic reserve read command from start to finish without interrupting execution to perform other operations that may be associated with other atomic operation commands (e.g., other atomic operation commands that are issued by tasks and/or threads that are executing concurrently with the task or thread that issued the atomic reserve read command). Performing a non-interruptible set of operations in this fashion allows atomic operations unit 14 to implement an atomic reserve read command that ensures proper functionality of a pipe even in cases where concurrently executing threads and/or tasks may attempt to reserve the pipe for reading at the same time. Further details regarding an example implementation of an atomic reserve read command are described below with respect to FIG. 4.

Thread 20A may determine whether the read reservation was successful. To determine whether the read reservation was successful, thread 20A may, in some examples, determine whether the pipe has enough unread and unreserved packet entries to support the read reservation request based on the returned pipe state parameters in a manner similar to how atomic operations unit 14 may make the same determination as discussed in further detail below. The returned pipe state parameters may be indicative of the state of the pipe prior to the performance of the reserve read operation.

If the read reservation was not successful, thread 20A may not read data from the pipe or commit read packets to the pipe in response to completion of the read reserve operation. In some examples, if the read reservation was not successful, thread 20A may terminate execution with an error condition. In further examples, if the read reservation was not successful, thread 20A may perform one or more operations to handle the condition. For example, thread 20A may stop attempting to perform a read reservation and continue performing other operations. As another example, thread 20A may attempt to repeat the read reserve operation after a period of time. This may allow a producer thread time to write one or more packets to the pipe, thereby adding additional packet entries that can be reserved in a subsequent read reserve operation.

If the read reservation was successful, thread 20A may determine the physical packet entries of pipe data buffer 24 from which to read data based on the one or more pipe state parameters that were returned by atomic operations unit 14 when processing the atomic read reserve command. In examples where thread 20A receives a first packet offset parameter, a packet count parameter, and a reserved packet count parameter, thread 20A may determine the first physical packet entry of pipe data buffer 24 from which to read data, for example, by using the packet entry that corresponds to the first packet offset parameter. Thread 20A may read data from the determined first physical packet entry and the following packet entries up to the number of packet entries that were reserved. If the end of pipe data buffer 24 is reached before the reserved number of packet entries are read, thread 20A may wrap around to the beginning of pipe data buffer 24 to read additional physical packet entries.

To read data from the reserved packet entries in pipe data buffer 24, thread 20A may, in some examples, determine a physical memory address for one or more of the packet entries based on a pipe address that is associated with the pipe to be read and based on the determined physical packet entries from which to read data and/or based on the returned pipe state parameters. In some examples, the pipe address may be provided to thread 20A by a host program that allocated the pipe in data storage system 16. In such examples, the pipe address may, in some examples, be stored in an on-chip constant memory of compute unit 12B. For example, a host program executing on a host processor may, in some examples, provide the pipe address as an argument to a function that invokes the execution of thread 20A on compute unit 12B (e.g., the constant parameters may be provided as kernel arguments to compute unit 12B).

In some examples, thread 20A may issue one or more memory read requests to data storage system 16 to read the packet data from the reserved packet entries contained in data storage system 16. Each of read requests may specify the physical location (e.g., memory addresses) in data storage system 16 from which to read the data. The read requests may collectively read the packet data from all of the reserved packet entries.

Thread 20A may, in some examples, issue the memory read requests directly to data storage system 16 and/or a memory subsystem that includes data storage system 16. In other words, in such examples, computing system 10 may include a communication interface between compute unit 12B and data storage system 16 that bypasses atomic operations unit 14, and thread 20A may issue the memory read requests to data storage system 16 via that communication interface such that the memory read requests are received by data storage system 16 but do not pass through atomic operations unit 14.

After the packet data has been read from the reserved packet entries in pipe data buffer 24, atomic operations unit 14 may issue an atomic commit read command to atomic operations unit 14. The atomic commit read command may indicate that thread 20A has finished reading data from the reserved packet entries of the pipe, and that such packet entries are ready to be removed from the pipe.

The atomic commit read command may include a parameter indicative of the pipe to which data was read. The parameter indicative of the pipe to which data was read may, in some examples, be a pipe address parameter. For example, the pipe address parameter may be a memory address that corresponds to a location in a memory subsystem (e.g., data storage system 16) where pipe state parameters 22 are stored for a particular pipe that is being accessed. A pipe address parameter may be used to identify which pipe to access in data storage system 16 when data storage system 16 contains data for more than one pipe, and to identify the location in data storage system 16 where the pipe data is stored.

In response to receiving the atomic commit read command, atomic operations unit 14 may perform an atomic commit read operation. The atomic commit read operation may be an example of atomic read-modify-write operation that modifies two or more pipe state parameters as described in this disclosure.

To perform the atomic commit read operation, atomic operations unit 14 may obtain the pipe state parameters from data storage system 16. Unlike the atomic reserve read operation, atomic operations unit 14 may, in some examples, not return any pipe state parameters that are obtained from data storage system 16 to thread 20A when performing the atomic commit read operation.

Atomic operations unit 14 may generate a modified value for a first pipe state parameter such that the modified value reflects that the pipe has one less uncommitted reservation relative to how many uncommitted reservations the pipe had prior to performing the atomic commit read operation. In some examples, the first pipe parameter may be a reservation count parameter, and atomic operations unit 14 may decrement the reservation count parameter to reflect that the pipe has one less uncommitted reservation relative to how many uncommitted reservations the pipe had prior to performing the atomic commit read operation.

Atomic operations unit 14 may further determine whether all reservations for the pipe have been committed based on one or more of the pipe state parameters. In response to determining that all reservations for the pipe have been committed, atomic operations unit 14 may generate one or more modified values for the pipe state parameters such that the modified values reflect that committed entries have been removed from the pipe. In some examples, atomic operations unit 14 may decrement a packet count parameter by an amount equal to a reserved packet count parameter, and may reset the reserved packet count parameter to zero in order to reflect that committed entries have been removed from the pipe. In such examples, atomic operations unit 14 may also increment the first packet offset parameter by an amount equal to the reserved packet count parameter. If the number of reserved packet entries causes the first packet offset parameter to be incremented past the end of pipe data buffer 24, the first packet offset parameter may be wrapped around to the beginning of pipe data buffer 24 in a ring buffer-like fashion. In response to determining that all reservations for the pipe have not been committed, atomic operations unit 14 may generate modified values for the pipe state parameters other than the first pipe state parameter (e.g., the reservation count parameter) such that the modified values are equal to the previous values for the pipe state parameters.

After determining the modified values for the pipe state parameters, atomic operations unit 14 may write the modified values for the pipe state parameters 22 to data storage system 16. The functionality attributed to the atomic commit read command may, in some examples, be performed as part of a non-interruptible set of operations. In other words, atomic operations unit 14 may perform the functionality attributed to the atomic read commit command from start to finish without interrupting execution to perform other operations that may be associated with other atomic operation commands (e.g., other atomic operation commands that are issued by tasks and/or threads that are executing concurrently with the task or thread that issued the atomic commit read command). Performing a non-interruptible set of operations in this fashion allows atomic operations unit 14 to implement an atomic commit read command that ensures proper functionality of a pipe even in cases where concurrently executing threads and/or tasks may attempt to commit read packet entries to the pipe at the same time. Further details regarding an example implementation of an atomic commit read command are described below with respect to FIG. 5.

A pipe may include a plurality of packet entries where each of the packet entries is configurable to store a data packet for the pipe. The size of a pipe may refer to the number of packet entries included in the pipe. In some examples, an API that supports pipes may allow a programmer to specify any size of pipe within particular limits. However, a runtime program that supports the API (e.g., a driver) may, in some examples, implement the pipe such that the number of packet entries included in the physical memory allocated for the pipe is different than the number of packet entries specified by the programmer. For example, a runtime program may implement pipes such that the number of packet entries included in the physical memory allocated for each of the pipes is always a power of two. Even though the number of packet entries allocated in the physical memory by the runtime program may be different than the number of packet entries specified by the host program, the runtime program may control the state of the pipe in such a way that, from the perspective of the tasks that are using the pipe, the pipe appears to have only the number of packet entries specified by the host program.

For example, if a runtime program implements pipes such that the number of packet entries included in the physical memory allocated for each pipe is always a power of two and if a programmer specifies a pipe size of 11 packet entries, the runtime program may allocate the physical memory such that the physical memory includes 16 packet entries for the pipe. In this example, the runtime program may control the state of the pipe in such a way that, even though 16 packet entries have been allocated for the pipe in physical memory, the pipe appears to have only 11 packet entries from the perspective of the tasks that are using the pipe.

The packet entries of a pipe as viewed from the perspective of the source code and/or programmer may be referred to herein as logical packet entries, and the packet entries that are actually allocated in physical memory for a pipe may be referred to herein as physical packet entries. Similarly, the size of a pipe (e.g., number of packet entries) that is specified by the source code and/or programmer may be referred to herein as the logical size of the pipe, and the number of packet entries that are actually allocated in memory for a pipe may be referred to herein as the physical size of the pipe.

Returning to the atomic reserve write command, in addition to including a parameter indicative of the pipe to which data is to be written and a parameter indicative of the number of packet entries to be reserved for writing, the atomic reserve write command may, in some examples, further include a parameter indicative of the logical size of the pipe and/or a parameter indicative of the physical size of the pipe minus one. The atomic reserve write operation may use the parameter indicative of the logical size of the pipe to determine whether a pipe has enough uncommitted and unreserved entries to support a write reservation request. For example, atomic operations unit 14 may subtract the total number of packets committed to the pipe and the total number of packet entries reserved for writing from the logical size of the pipe, and determine whether the difference is greater than or equal to the number of packets requested by the reservation request to be reserved for writing. If the difference is greater than or equal to the number of packets requested by the reservation request to be reserved for writing, then atomic operations unit 14 may determine that the pipe has enough uncommitted and unreserved entries to support the write reservation request. Otherwise, if the difference is not greater than or equal to the number of packets specified by the reservation request to be reserved for writing, then atomic operations unit 14 may determine that the pipe does not have enough uncommitted and unreserved entries to support the write reservation request.

Similarly, for the atomic reserve read command, in some examples, in addition to including a parameter indicative of the pipe from which data is to be read and a parameter indicative of the number of packet entries to be reserved for reading, the atomic reserve read command may further include a parameter indicative of the logical size of the pipe and/or a parameter indicative of the physical size of the pipe minus one. The atomic reserve read operation may use the parameter indicative of the logical size of the pipe to determine whether a pipe has enough unread and unreserved packet entries in which packet data is stored to support a read reservation request. For example, atomic operations unit 14 may add the number of packets previously reserved for reading and the number of packets requested by the reservation request to be reserved for reading, and determine whether the sum is less than or equal to the total number of packets stored in the pipe (i.e., the total number of packets written and committed to the pipe). If the sum is less than or equal to the total number of packets stored in the pipe, then atomic operations unit 14 may determine that the pipe has enough packet entries to support the read reservation request. Otherwise, if the sum is not less than or equal to the total number of packets stored in the pipe, then atomic operations unit 14 may determine that the pipe does not have enough packet entries to support the read reservation request.

Also, for the atomic commit read command, in some examples, in addition to including a parameter indicative of the pipe from which data was read, the atomic read command may further include a parameter indicative of the physical size of the pipe minus one. The physical size of the pipe minus one parameter may be used by the atomic commit read command to update the first packet offset parameter when all read reservations have been committed. For example, the physical size of the pipe minus one parameter may be used to implement a modulus operation that allows the first packet offset parameter to wrap around from the end of the physical packet entries to the beginning of the physical packet entries when the amount by which the first packet offset parameter is incremented causes the first packet offset parameter to be incremented past the end of pipe data buffer 24.

In some examples, one or more of the parameter indicative of the pipe to which data is to be written, the parameter indicative of the size of the pipe, and the parameter indicative of the size of the pipe minus one may be provided to thread 18A and/or thread 20A by a host program that allocated the pipe in data storage system 16. Such parameters may be referred to as constant parameters because such parameters may be determined when the pipe is allocated and may remain constant throughout the execution of threads 18, 20. In such examples, the constant parameters may, in some examples, be stored in an on-chip constant memory of compute unit 12A and/or compute unit 12B. A host program executing on a host processor may, in some examples, provide the constant parameters as arguments to a function that invokes the execution of thread 18A on compute unit 12A and/or thread 20A on compute unit 12B (e.g., the constant parameters may be provided as kernel arguments to thread 18A and thread 20A).

Further details regarding example functionality performed by atomic operations unit 14 for the atomic reserve commands and atomic commit commands will now be described with respect to FIGS. 2-5. The functionality for each of the atomic operation commands illustrated in FIGS. 2-5 may be implemented in hardware, and each of the commands may an example of a hardware-based atomic read-modify-write operation that modifies two or more pipe state parameters as described in this disclosure.

FIG. 2 is a conceptual diagram illustrating example pseudo-code that defines the interface and functionality of an example atomic reserve write command according to this disclosure. Lines 1-4 of the pseudo-code map the pipe state parameters to be accessed and/or modified in this example to respective elements of an array. The pipe state parameters include a first packet offset parameter that is indicative of a packet entry that stores a starting packet for the pipe (i.e., "FST_PKT"), a packet count parameter that is indicative of how many packets are currently stored in the pipe (i.e., "PKT_CNT"), a reserved packet count parameter that is indicative of how many packet entries are currently reserved in the pipe (i.e., "RES_CNT"), and a reservation count parameter that is indicative of how many uncommitted reservations are currently pending for the pipe (i.e., "NUM_RES"). The mapping maps the first packet offset parameter to a first element of the array, the packet count parameter to a second element of the array, etc.

Lines 5-11 of the pseudo-code specify the interface for the atomic reserve write command. Line 5 specifies the name of the command, and lines 7-10 specify the arguments or parameters to be used when invoking the command. Line 7 specifies a pipe address parameter that may point to the region of memory in data storage system 16 that stores pipe state parameters 22 for the pipe to be accessed. In some examples, the pipe address parameter may be a 32-bit address or a 64-bit address that is based on the machine address. Line 8 specifies a physical pipe size minus one parameter that corresponds to the number of physical packet entries that are allocated for the pipe in data storage system 16 minus one. Line 9 specifies a logical pipe size parameter that is indicative of the number logical pipe entries that were requested by the source code from the host program when the pipe was created (i.e., the size of the pipe from the programmer's point of view). Line 10 specifies a requested number of packets parameter that is indicative of the number of packets that the requesting task is requesting to reserve for writing. In some examples, the interface for the atomic reserve write command may not include a physical pipe size minus one parameter.

When the atomic reserve write command is invoked by a thread, atomic operations unit 14 may perform a read operation that reads the four pipe state parameters used in this example from data storage system 16 (line 13). As indicated in FIG. 2, atomic operations unit 14 may read an array that contains all four pipe state parameters from data storage system 16. In some examples, each of the parameters may be 32 bits, and the read operation may be a single 128-bit load operation. In other words, in some examples, a single read operation and/or load operation may be used with respect to data storage system 16 to load all of the pipe state parameters that are accessed and/or modified during the atomic operation. In this way, an atomic read-modify-write operation may be able to modify multiple pipe state parameters without requiring more than one memory read transaction.

After reading the pipe state parameters, atomic operations unit 14 may return three of the pipe state parameters that were read from data storage system 16 to the requesting thread (lines 14-15). The three pipe state parameters that are returned in this example are the first packet offset parameter, the packet count parameter and the reserved packet count parameter. The requesting thread (e.g., thread 18A) may determine the physical packet entries of pipe data buffer 24 in which to write the data based on the returned pipe state parameters. For example, thread 18A may determine the first physical packet entry of pipe data buffer 24 in which to write data, for example, by adding the values of each of these parameters together. Thread 18A may write data to the determined first physical packet entry and the following packet entries up to the number of packet entries that were reserved. If the end of pipe data buffer 24 is reached before the reserved number of packet entries is written, thread 18A may wrap around to the beginning of pipe data buffer 24 to write to additional physical packet entries.

After reading the pipe state parameters, atomic operations unit 14 may perform a modify operation that generates modified values for the pipe state parameters (lines 16-20). To perform the modify operation, atomic operations unit 14 may determine whether a pipe has enough uncommitted and unreserved entries to support a write reservation request based on one or more of the pipe state parameters (line 16). More specifically, in this example, atomic operations unit 14 may determine whether the logical pipe size minus the packet count parameter minus the reserved packet count parameter is greater than or equal to the requested number of packets (line 16). In response to determining that the pipe has enough uncommitted and unreserved entries to support the write reservation request, atomic operations unit 14 may generate modified values for the pipe state parameters as specified in lines 17-20.

For example, atomic operations unit 14 may perform an increment operation that increments the reserved packet count parameter by an amount equal to the requested number of packets (line 17), and if the requested number of packets is not equal to zero, atomic operations unit 14 may perform an increment by one operation that increments the reservation count parameter by one (lines 18-20). The inclusion of the increment by one operation in the if-clause of line 18 may ensure that the reservation count parameter is not modified when the requested number of packets is equal to zero. A user may set the requested number of packets equal to zero and issue the atomic reserve write command to obtain the current state of the pipe without making a reservation (i.e., without modifying the parameters to reflect that a write reservation has occurred).

Conceptually, in response to determining that the pipe has enough uncommitted and unreserved entries to support the write reservation request, atomic operations unit 14 may modify the pipe state parameters in different ways depending on whether the requested number of packets is greater than zero. If the requested number of packets is greater than zero, atomic operations unit 14 may generate modified values for the pipe state parameters such that the modified values reflect that a write reservation has been made for the pipe (lines 17-19). If the requested number of packets is equal to zero, then atomic operations unit 14 may generate modified values for the pipe state parameters such that the modified values are equal to the previous values for the pipe state parameters (i.e., such that the modified values reflect that a write reservation has not been made for the pipe) (lines 17-19).

In response to determining that the pipe does not have enough uncommitted and unreserved entries to support the write reservation request or in response to the reservation count parameter being equal to zero, atomic operations unit 14 may not update the pipe state parameter values so that the pipe state remains the same. Not updating the pipe state parameter values so that the pipe state remains the same may correspond to generating modified values for the pipe state parameters such that the modified values are equal to the previous values for the pipe state parameters (i.e., such that the modified values reflect that a write reservation has not been made for the pipe).

After generating the modified pipe state parameter values, atomic operations unit 14 may perform a write operation (e.g., store operation) that writes the four pipe state parameters used in this example to data storage system 16 (line 21). As indicated in FIG. 2, atomic operations unit 14 may write an array that contains all four pipe state parameters to data storage system 16. In some examples, each of the parameters may be 32 bits, and the write operation may be a single 128-bit store operation. In other words, in some examples, a single write operation and/or store operation may be used with respect to data storage system 16 to store all of the pipe state parameters that are accessed and/or modified during the atomic operation. In this way, an atomic read-modify-write operation may be able to modify multiple pipe state parameters without requiring more than one memory write transaction. Processing of the atomic reserve write operation is now complete.

In some examples, the syntax of the atomic reserve write command may take the following form:
PIPE_RSV_WRITE Dest, Src0, Src1
where Dest corresponds to a general purpose register (GPR) identification (ID) of a first GPR in a group of three GPR registers that are to receive the output pipe state parameters which are returned by the atomic reserve write command, Src0 corresponds to a GPR ID for a register that contains the requested number of packets, and Src1 corresponds to a constant ID for a first register in a group of four constant registers that contain the physical pipe size minus one, the logical pipe size, and the pipe address. The pipe address may be stored in one or two registers that contain a 32-bit or 64-bit address which points to pipe state parameters 22. In some examples, the physical pipe size may be a power of two such that the physical pipe size minus one is a power of two minus one.

As discussed above, the atomic reserve write operation may return the first packet offset parameter, the packet count parameter, and the reserved packet count parameter. As such, the command may be an example of a return atomic. In some examples, one or both of compute units 12 may include one or more quad register groups where each quad register group includes four registers, and data for the four registers can be read from and/or stored in memory as part of a single cache transaction and/or memory transaction. In such examples, the three pipe state parameters that are returned by the atomic reserve write operation may, in some examples, be returned in three consecutive registers within a quad register group. In this way, the three pipe state parameters may be fetched by one or both of compute units 12 as part of a single cache transaction and/or memory transaction.

In some examples, the atomic reserve write command may be used to implement a reserve_write_pipe command as defined according to the OpenCL™ C specification. In additional examples, by setting the reservation count parameter equal to zero, the atomic reserve write command may return the current state of the pipe without adding a reservation to the pipe. In this way, the atomic reserve write command may also be used to implement a get_pip_num_p-ackets command as defined according to the OpenCL™ C specification.

FIG. 3 is a conceptual diagram illustrating example pseudo-code that defines the interface and functionality of an example atomic commit write command according to this disclosure. Lines 1-4 of the pseudo-code map the pipe state parameters to be accessed and/or modified in this example to respective elements of an array. The pipe state parameters and mapping are the same as that which was described above with respect to FIG. 2.

Line 5 of the pseudo-code specifies the interface for the atomic commit write command including the name of the command and the argument or parameter to be used when invoking the command. More specifically, the atomic commit write command may use a pipe address parameter that points to the region of memory in data storage system 16 that stores pipe state parameters 22. In some examples, the pipe address parameter may be a 32-bit address or a 64-bit address that is based on the machine address.

When the atomic commit write command is invoked by a thread, atomic operations unit 14 may perform a read operation that reads the four pipe state parameters used in this example from data storage system 16 (line 7). As indicated in FIG. 3, atomic operations unit 14 may read an array that contains all four pipe state parameters from data storage system 16. In some examples, each of the parameters may be 32 bits, and the read operation may be a single 128-bit load operation. In other words, in some examples, a single read operation and/or load operation may be used with respect to data storage system 16 to load all of the pipe state parameters that are accessed and/or modified during the atomic operation. In this way, an atomic read-modify-write operation may be able to modify multiple pipe state parameters without requiring more than one memory read transaction.

After reading the pipe state parameters, atomic operations unit 14 may perform a modify operation that generates modified values for the pipe state parameters (lines 8-12). To perform the modify operation, atomic operations unit 14 may perform a decrement by one operation that decrements the reservation count parameter by one (line 8). Decrementing the reservation count parameter by one may correspond to generating a modified value for a first pipe state parameter such that the modified value reflects that the pipe has one less uncommitted reservation relative to how many uncommitted reservations the pipe had prior to performing the atomic commit write operation.

Atomic operations unit 14 may further determine whether all reservations for the pipe have been committed based on one or more of the pipe state parameters (line 9). More specifically, in this example, after decrementing the reservation count parameter by one, atomic operations unit 14 may determine whether the reservation count parameter is equal to zero.

In response to determining that all reservations for the pipe have been committed, atomic operations unit 14 may generate one or more modified values for the pipe state parameters such that the modified values reflect that committed entries have been placed into the pipe (lines 10-11). More specifically, in this example, atomic operations unit 14 may perform an increment operation that increments the packet count parameter by an amount equal to the reserved packet count parameter (line 10), and a reset operation that resets the reserved packet count parameter to zero (line 11).

In response to determining that not all reservations for the pipe have been committed, atomic operations unit 14 may not update the other pipe state parameter values besides the reservation count parameter that was already updated such that the remaining pipe state parameters remain the same. Not updating the remaining pipe state parameter values so that the remaining pipe state parameters remain the same may correspond to generating modified values for the remaining pipe state parameters such that the modified values are equal to the previous values for the pipe state parameters.

After generating the modified pipe state parameter values, atomic operations unit 14 may perform a write operation (e.g., store operation) that writes the four pipe state parameters used in this example to data storage system 16 (line 13). As indicated in FIG. 3, atomic operations unit 14 may write an array that contains all four pipe state parameters to data storage system 16. In some examples, each of the parameters may be 32 bits, and the write operation may be a single 128-bit store operation. In other words, in some examples, a single write operation and/or store operation may be used with respect to data storage system 16 to store all of the pipe state parameters that are accessed and/or modified during the atomic operation. In this way, an atomic read-modify-write operation may be able to modify multiple pipe state parameters without requiring more than one memory write transaction. Processing of the atomic commit write command is now complete.

In some examples, the syntax of the atomic commit write command may take the following form:
PIPE_CMT_WRITE Src0
where no Dest register is specified, and Src0 corresponds to a constant ID for a first register in a group of four constant registers that contain the physical pipe size minus one, the logical pipe size, and the pipe address. The pipe address may be stored in one or two registers that contain a 32-bit or 64-bit address which points to pipe state parameters 22. In some examples, the physical pipe size may be a power of two such that the physical pipe size minus one is a power of two minus one.

The atomic commit write command, in this example, does not return any values. As such, the command may be an example of a no-return atomic. In some examples, the atomic commit write command may be used to implement a commit_write_pipe command as defined according to the OpenCL™ C specification.

FIG. 4 is a conceptual diagram illustrating example pseudo-code that defines the interface and functionality of an example atomic reserve read command according to this disclosure. Lines 1-4 of the pseudo-code map the pipe state parameters to be accessed and/or modified in this example to respective elements of an array. The pipe state parameters and mapping are the same as that which was described above with respect to FIG. 2.

Lines 5-11 of the pseudo-code specify the interface for the atomic reserve read command. Line 5 specifies the name of the command, and lines 7-10 specify the arguments or parameters to be used when invoking the command. Line 7 specifies a pipe address parameter that may point to the region of memory in data storage system 16 that stores pipe state parameters 22. In some examples, the pipe address parameter may be a 32-bit address or a 64-bit address that is based on the machine address. Line 8 specifies a physical pipe size minus one parameter that corresponds to the number of physical packet entries that are allocated for the pipe in data storage system 16 minus one. Line 9 specifies a logical pipe size parameter that is indicative of the number logical pipe entries that were requested by the source code from the host program when the pipe was created (i.e., the size of the pipe from the programmer's point of view). Line 10 specifies a requested number of packets parameter that is indicative of the number of packets that the requesting task is requesting for reading. In some examples, the interface for the atomic reserve read command may not include a physical pipe size minus one parameter.

When the atomic reserve read command is invoked by a thread, atomic operations unit 14 may perform a read operation that reads the four pipe state parameters used in this example from data storage system 16 (line 13). As indicated in FIG. 4, atomic operations unit 14 may read an array that contains all four pipe state parameters from data storage system 16. In some examples, each of the parameters may be 32 bits, and the read operation may be a single 128-bit load operation. In other words, in some examples, a single read operation and/or load operation may be used with respect to data storage system 16 to load all of the pipe state parameters that are accessed and/or modified during the atomic operation. In this way, an atomic read-modify-write operation may be able to modify multiple pipe state parameters without requiring more than one memory read transaction.

After reading the pipe state parameters, atomic operations unit 14 may return three of the pipe state parameters that were read from data storage system 16 to the requesting thread (lines 14-15). The three pipe state parameters that are returned in this example are the first packet offset parameter, the packet count parameter and the reserved packet count parameter. The requesting thread (e.g., thread 20A) may determine the physical packet entries of pipe data buffer 24 from which to read the data based on the returned pipe state parameters. For example, thread 20A may determine the first physical packet entry of pipe data buffer 24 from which to read data, for example, by using the packet entry that corresponds to the first offset parameter as the first packet entry. Thread 20A may read data from the determined first physical packet entry and the following packet entries up to the number of packet entries that were reserved. If the end of pipe data buffer 24 is reached before the reserved number of packet entries are read, thread 20A may wrap around to the beginning of pipe data buffer 24 to read additional physical packet entries.

After reading the pipe state parameters, atomic operations unit 14 may perform a modify operation that generates modified values for the pipe state parameters (lines 16-20). To perform the modify operation, atomic operations unit 14 may determine whether a pipe has enough unread and unreserved packet entries in which packet data is stored to support a read reservation request based on one or more of the pipe state parameters (line 16). More specifically, in this example, atomic operations unit 14 may determine whether the sum of the reserved packet count parameter and the requested number of packets is less than or equal to the packet count parameter (line 16). In response to determining that the pipe has enough unread and unreserved packet entries in which packet data is stored to support a read reservation request, atomic operations unit 14 may generate modified values for the pipe state parameters as specified in lines 17-20.

For example, atomic operations unit 14 may perform an increment operation that increments the reserved packet count parameter by an amount equal to the requested number of packets (line 17), and if the requested number of packets is not equal to zero, atomic operations unit 14 may perform an increment by one operation that increments the reservation count parameter by one (lines 18-20). The inclusion of the increment by one operation in the if-clause of line 18 may ensure that the reservation count parameter is not modified when the requested number of packets is equal to zero. A user may set the requested number of packets equal to zero and issue the atomic reserve read command to obtain the current state of the pipe without making a reservation (i.e., (without modifying the parameters to reflect that a read reservation has occurred).

Conceptually, in response to determining that the pipe has enough unread and unreserved packet entries in which packet data is stored to support a read reservation request, atomic operations unit 14 may modify the pipe state parameters in different ways depending on whether the requested number of packets is greater than zero. If the requested number of packets is greater than zero, atomic operations unit 14 may generate modified values for the pipe state parameters such that the modified values reflect that a read reservation has been made for the pipe (lines 17-19). If the requested number of packets is equal to zero, then atomic operations unit 14 may generate modified values for the pipe state parameters such that the modified values are equal to the previous values for the pipe state parameters (i.e., such that the modified values reflect that a read reservation has not been made for the pipe) (lines 17-19).

In response to determining that the pipe does not have enough unread and unreserved packet entries in which packet data is stored to support a read reservation request or in response to the reservation count parameter being equal to zero, atomic operations unit 14 may not update the pipe state parameter values so that the pipe state remains the same. Not updating the pipe state parameter values so that the pipe state remains the same may correspond to generating modified values for the pipe state parameters such that the modified values are equal to the previous values for the pipe state parameters (i.e., such that the modified values reflect that a read reservation has not been made for the pipe).

After generating the modified pipe state parameter values, atomic operations unit 14 may perform a write operation (e.g., store operation) that writes the four pipe state parameters used in this example to data storage system 16 (line 21). As indicated in FIG. 4, atomic operations unit 14 may write an array that contains all four pipe state parameters to data storage system 16. In some examples, each of the parameters may be 32 bits, and the write operation may be a single 128-bit store operation. In other words, in some examples, a single write operation and/or store operation may be used with respect to data storage system 16 to store all of the pipe state parameters that are accessed and/or modified during the atomic operation. In this way, an atomic read-modify-write operation may be able to modify multiple pipe state parameters without requiring more than one memory write transaction. Processing of the atomic reserve read command is now complete.

In some examples, the syntax of the atomic reserve read command may take the following form:

PIPE_RSV_READ Dest, Src0, Src1 where Dest corresponds to a general purpose register (GPR) identification (ID) of a first GPR in a group of three GPR registers that are to receive the output pipe state parameters which are returned by the atomic reserve read command, Src0 corresponds to a GPR ID for a register that contains the requested number of packets, and Src1 corresponds to a constant ID for a first register in a group of four constant registers that contain the physical pipe size minus one, the logical pipe size, and the pipe address. The pipe address may be stored in one or two registers that contain a 32-bit or 64-bit address which points to pipe state parameters 22. In some examples, the physical pipe size may be a power of two such that the physical pipe size minus one is a power of two minus one.

As discussed above, the atomic reserve read operation may return the first packet offset parameter, the packet count parameter, and the reserved packet count parameter. As such, the command may be an example of a return atomic. In some examples, one or both of compute units 12 may include one or more quad register groups where each quad register group includes four registers, and data for the four registers can be read from and/or stored in memory as part of a single cache transaction and/or memory transaction. In such examples, the three pipe state parameters that are returned by the atomic reserve read operation may, in some examples, be returned in three consecutive registers within a quad register group. In this way, the three pipe state parameters may be fetched by one or both of compute units 12 as part of a single cache transaction and/or memory transaction.

In some examples, the atomic reserve read command may be used to implement a reserve_read_pipe command as defined according to the OpenCL™ C specification. In additional examples, by setting the reservation count parameter equal to zero, the atomic reserve read command may return the current state of the pipe without adding a reservation to the pipe. In this way, the atomic reserve read command may also be used to implement a get_pip_num_p-ackets command as defined according to the OpenCL™ C specification.

FIG. 5 is a conceptual diagram illustrating example pseudo-code that defines the interface and functionality of an example atomic commit read command according to this disclosure. Lines 1-4 of the pseudo-code map the pipe state parameters to be accessed and/or modified in this example to respective elements of an array. The pipe state parameters and mapping are the same as that which was described above with respect to FIG. 2.

Line 5 of the pseudo-code specifies the interface for the atomic commit read command including the name of the command and the arguments or parameters to be used when invoking the command. More specifically, the atomic commit read command may use a pipe address parameter that points to the region of memory in data storage system 16 that stores pipe state parameters 22, and a physical pipe size minus one parameter that corresponds to the number of physical packet entries that are allocated for the pipe in data storage system 16 minus one. In some examples, the pipe address parameter may be a 32-bit address or a 64-bit address that is based on the machine address.

When the atomic commit read command is invoked by a thread, atomic operations unit 14 may perform a read operation that reads the four pipe state parameters used in this example from data storage system 16 (line 7). As indicated in FIG. 5, atomic operations unit 14 may read an array that contains all four pipe state parameters from data storage system 16. In some examples, each of the parameters may be 32 bits, and the read operation may be a single 128-bit load operation. In other words, in some examples, a single read operation and/or load operation may be used with respect to data storage system 16 to load all of the pipe state parameters that are accessed and/or modified during the atomic operation. In this way, an atomic read-modify-write operation may be able to modify multiple pipe state parameters without requiring more than one memory read transaction.

After reading the pipe state parameters, atomic operations unit 14 may perform a modify operation that generates modified values for the pipe state parameters (lines 8-13). To perform the modify operation, atomic operations unit 14 may perform a decrement by one operation that decrements the reservation count parameter by one (line 8). Decrementing the reservation count parameter by one may correspond to generating a modified value for a first pipe state parameter such that the modified value reflects that the pipe has one less uncommitted reservation relative to how many uncommitted reservations the pipe had prior to performing the atomic commit read commit operation.

Atomic operations unit 14 may further determine whether all reservations for the pipe have been committed based on one or more of the pipe state parameters (line 9). More specifically, in this example, after decrementing the reservation count parameter by one, atomic operations unit 14 may determine whether the reservation count parameter is equal to zero.

In response to determining that all reservations for the pipe have been committed, atomic operations unit 14 may generate one or more modified values for the pipe state parameters such that the modified values reflect that committed entries have been removed from the pipe (lines 10-12). More specifically, in this example, atomic operations unit 14 may perform a modulo-addition operation that increments the first packet offset parameter by an amount equal to the reserved packet count parameter and performs a modulo operation on the result with the physical size of the pipe being the modulus (line 10). Atomic operations unit 14 may also perform a decrement operation that decrements the packet count parameter by an amount equal to the reserved packet count parameter (line 11), and a reset operation that resets the reserved packet count parameter to zero (line 12).

The physical size of the pipe minus one parameter may be used by the atomic read commit command to perform the modulo-addition operation. More specifically, a bit-wise AND operation is performed using the sum of the first packet offset parameter and the reserved packet count parameter as the first operand and the physical pipe size minus one as the modulus. This may allow the first packet offset parameter to wrap around from the end of the physical packet entries to the beginning of the physical packet entries in a ring buffer-like fashion when the amount by which the first packet offset parameter is incremented causes the first packet offset parameter to be incremented past the end of pipe data buffer 24.

In response to determining that not all reservations for the pipe have been committed, atomic operations unit 14 may not update the other pipe state parameter values besides the reservation count parameter that was already updated such that the remaining pipe state parameters remain the same. Not updating the remaining pipe state parameter values so that the remaining pipe state parameters remain the same may correspond to generating modified values for the remaining pipe state parameters such that the modified values are equal to the previous values for the pipe state parameters.

After generating the modified pipe state parameter values, atomic operations unit 14 may perform a write operation (e.g., store operation) that writes the four pipe state parameters used in this example to data storage system 16 (line 13). As indicated in FIG. 5, atomic operations unit 14 may write an array that contains all four pipe state parameters to data storage system 16. In some examples, each of the parameters may be 32 bits, and the write operation may be a single 128-bit store operation. In other words, in some examples, a single write operation and/or store operation may be used with respect to data storage system 16 to store all of the pipe state parameters that are accessed and/or modified during the atomic operation. In this way, an atomic read-modify-write operation may be able to modify multiple pipe state parameters without requiring more than one memory write transaction. Processing of the atomic commit read command is now complete.

In some examples, the syntax of the atomic commit read command may take the following form:

PI PE_CMT_READ Src0 where no Dest register is specified, and Src0 corresponds to a constant ID for a first register in a group of four constant registers that contain the physical pipe size minus one, the logical pipe size, and the pipe address. The pipe address may be stored in one or two registers that contain a 32-bit or 64-bit address which points to pipe state parameters 22. In some examples, the physical pipe size may be a power of two such that the physical pipe size minus one is a power of two minus one.

The atomic commit read command, in this example, does not return any values. As such, the command may be an example of a no-return atomic. In some examples, the atomic commit read command may be used to implement a commit read_pipe command as defined according to the OpenCL™ C specification.

In some examples, to allow a single read/load operation and a single write/store operation to be used to access the pipe state parameters, the number of bits used to store the pipe state parameters that are accessed and/or modified during the atomic operation may be the less than or equal to the number of bits included in a block of data that is read from or written to data storage system 16 during a single memory transaction. For example, the number of bits used to store the multiple pipe state parameters may be less than or equal to the number of bits in a memory word and/or the number of bits in a cache line. In some cases, the pipe state parameters for each of the pipes stored in a memory subsystem may be aligned such that all of the pipe state parameters for a pipe are stored in a single memory word and/or a single cache line of a memory subsystem. In this way, an atomic read-modify-write operation may be able to modify multiple pipe state parameters without requiring more than one memory read transaction or more than one memory write transaction.

In some examples, one or more of the parameter indicative of the pipe to which data is to be written, the parameter indicative of the size of the pipe, and the parameter indicative of the size of the pipe minus one may be provided to thread 18A and/or thread 20A by a host program that allocated the pipe in data storage system 16. Such parameters may be referred to as constant parameters because such parameters may be determined when the pipe is allocated and may remain constant throughout the lifetime of threads 18, 20. In such examples, the constant parameters may, in some examples, be stored in an on-chip constant memory of compute unit 12A and/or compute unit 12B. A host program executing on a host processor may, in some examples, provide the constant parameters as arguments to a function that invokes the execution of thread 18A on compute unit 12A and/or thread 20A on compute unit 12B (e.g., the constant parameters may be provided as kernel arguments to thread 18A and thread 20A).

Figure 6:
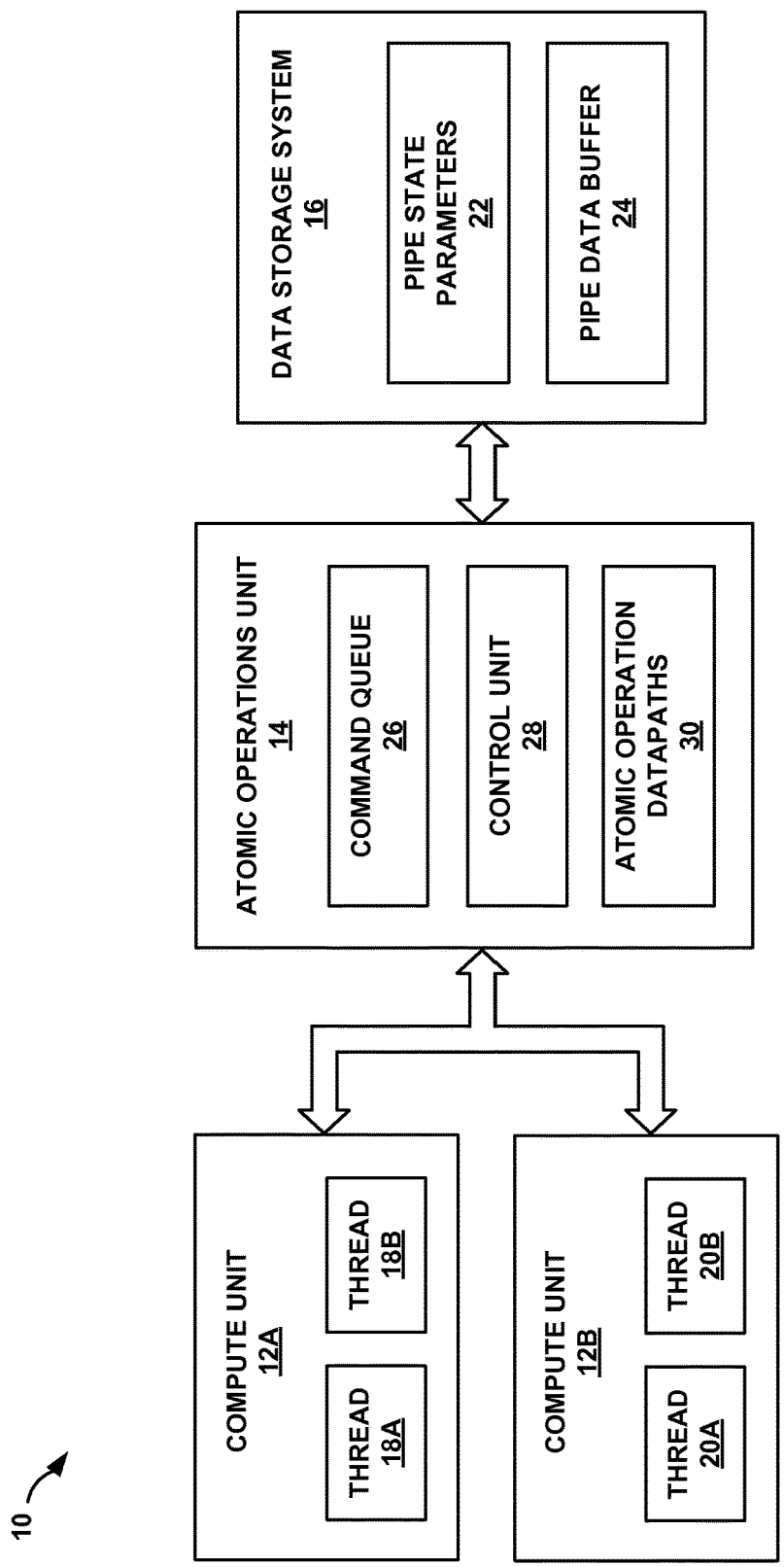
FIG. 6 is a block diagram of the example parallel computing system of FIG. 1 in which an example of the atomic operations unit of FIG. 1 is illustrated in greater detail.

FIG. 6 is a block diagram of the example computing system 10 of FIG. 1 in which an example of the atomic operations unit 14 shown in FIG. 1 is illustrated in greater detail. As shown in FIG. 6, atomic operations unit 14 includes a command queue 26, a control unit 28, and atomic operation datapaths 30.

Command queue 26 may store a plurality of atomic operation commands that are received from threads 18, 20 which are executing on compute units 12. The atomic operation commands may include for example, an atomic reserve write command, an atomic commit write command, an atomic reserve read command, and an atomic commit read command. The commands may alternatively be referred to herein as requests.

In response to receiving a command from one of threads 18, 20, command queue 26 may store the command in command queue 26 even if another command is currently being processed by atomic operations unit 14. This may allow atomic operations unit 14 to receive a plurality of commands from a plurality of threads and/or tasks that are concurrently executing on compute units 12 without requiring threads 18, 20 to wait until atomic operations unit 14 is free before issuing commands and without requiring threads 18, 20 to issue commands multiple times due to atomic operations unit 14 being busy.

Control unit 28 may process the atomic operation commands stored in command queue 26. To process a command, control unit 28 may perform an atomic operation that corresponds to the processed command. For example, to process an atomic reserve write command, control unit 28 may perform an atomic reserve write operation as described in this disclosure. To process an atomic commit write command, control unit 28 may perform an atomic commit write operation as described in this disclosure. To process an atomic reserve read command, control unit 28 may perform an atomic reserve read operation as described in this disclosure. To process an atomic commit read command, control unit 28 may perform an atomic commit read operation as described in this disclosure.

In some examples, control unit 28 may sequentially process the commands such that one atomic read-modify-write operation is performed at a time, and such that the performance of each atomic read-modify-write operation is completed prior to starting to perform another atomic read-modify-write operation. Processing the commands in this manner may ensure atomicity of the atomic operations.

In some examples, the above-mentioned atomic operations may be read-modify-write operations. In such examples, atomic operations unit 14 may receive a plurality of requests to perform hardware-based atomic read-modify-write operations from a plurality of threads executing in parallel, and sequentially perform a plurality of hardware-based atomic read-modify-write operations in response to receiving the plurality of requests to perform the hardware-based atomic read-modify-write operations. Each of the hardware-based atomic read-modify-write operations may be performed in response to a respective one of the plurality of requests.

The operations performed when processing the atomic operation commands may be atomic in the sense that the operations are performed from start to end without interruption from any atomic operations that may be requested by other tasks and/or threads that are executing concurrently with the task or thread that requested the atomic operation. In other words, during the performance of an atomic operation, no other threads and/or tasks may be able to read or modify the pipe state parameters that are modified and/or accessed by the currently executing atomic operation. In this way, race conditions may be avoided in cases where two or more tasks and/or threads attempt to modify the pipe state parameters of a pipe at the same time.

The atomic operations performed by atomic operations unit 14 may be hardware-based atomic operations. The atomic operations may be hardware-based in the sense that the atomic operations may be implemented by atomic operations unit 14 as a single, indivisible operation which may be invoked by threads and/or tasks that are communicatively coupled to atomic operations unit 14. The single, indivisible operation may be indivisible in the sense that atomic operations unit 14 performs the operation from start to finish without interrupting the operation to perform other atomic operations that may be requested by other tasks and/or threads that are executing concurrently with the task or thread that requested the atomic operation.

In the example atomic operations unit 14 of FIG. 6, in order to perform a hardware-based atomic operation, atomic operations unit 14 may include circuitry that implements one or more atomic operation datapaths 30. Each of atomic operation datapaths 30 may be a non-programmable datapath. In other words, each of atomic operation datapaths 30 may be configured to perform the functionality attributed to the respective datapath without requiring a user-specified program to be downloaded and executed by the datapath.

Atomic operation datapaths 30 may, in some examples, implement a hardware-based datapath for each of the atomic operations described in this disclosure. In some examples, a circuit may include a separate hardware-based datapath for each of the atomic operations. In further examples, a common hardware-based datapath may be configurable to perform two or more of the atomic operations described in this disclosure. In some examples, the common hardware-based datapath may be a read-modify-write operation datapath where the modify operation is configurable to perform different modify operations based on the type of atomic operation to be performed. In some examples, each of atomic operation datapaths 30 may include one or more ALUs to perform the modify operations of the associated atomic operation commands.

Figure 7:
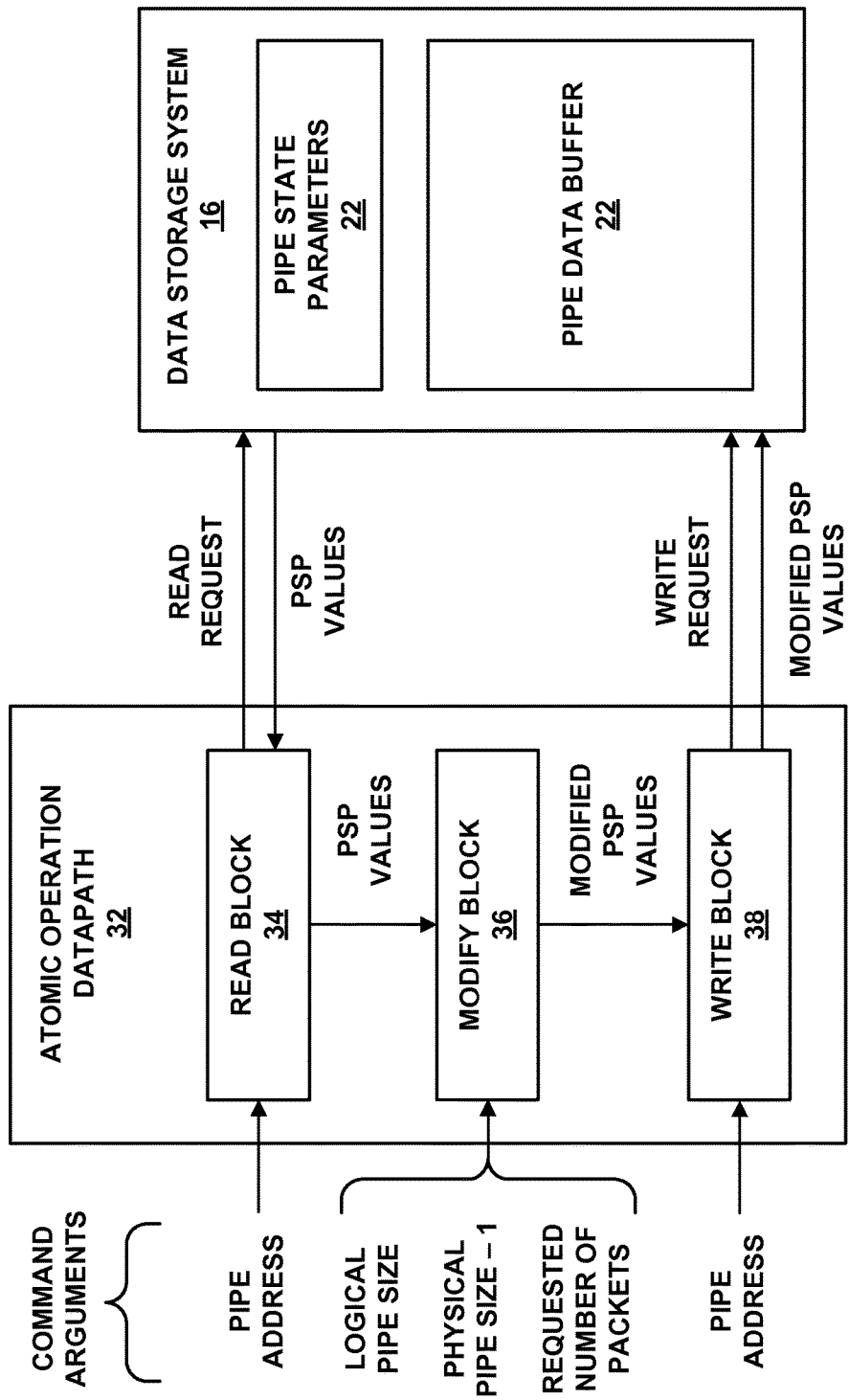
FIG. 7 is a conceptual diagram illustrating an example atomic operation datapath interacting with a data storage system according to this disclosure.

FIG. 7 is a conceptual diagram illustrating an example atomic operation datapath 32 interacting with a data storage system 16 according to this disclosure. Atomic operation datapath 32 may be configured to perform a hardware-based atomic read-modify-write operation that modifies two or more pipe state parameters that are indicative of the state of a pipe. Atomic operation datapath 32 may be an example of one of the atomic operation datapaths 30 illustrated and described above with respect to FIG. 6. Atomic operation datapath 32 includes a read block 34, a modify block 36, and a write block 38.

Read block 34 may be configured to perform a read operation that reads values that correspond to pipe state parameters 22 from a memory subsystem that includes data storage system 16. Modify block 36 may be configured to perform a modify operation that generates modified values for the pipe state parameters. Write block 38 may be configured to perform a write operation that writes the modified values for the pipe state parameters to the memory subsystem that includes data storage system 16.

Each of read block 34, modify block 36, and write block 38 may be implemented with circuitry that is configured to perform the functionalities attributed to such components. In some examples, one or more of read block 34, modify block 36 and write block 38 may be separate hardware blocks in atomic operation datapath 32. In further examples, a common hardware block may be configurable to implement one or more of read block 34, modify block 36 and write block 38.

As shown in FIG. 7, one or more of read block 34, modify block 36, and modify block 36 may receive command arguments (i.e., parameters) that were provided to atomic operations unit 14 in conjunction with the atomic operation command that was issued to atomic operations unit 14. The command arguments may include, for example, one or more of a pipe address, a physical pipe size minus one, a logical pipe size, and a requested number of packets.

The operation of atomic operation datapath 32 will now be described. Control unit 28 may initiate execution of an atomic read-modify-write operation using atomic operation datapath 32 in response to processing an atomic operation command. Control unit 28 may provide one or more command arguments to atomic operation datapath 32 in order to perform the atomic read-modify-write operation.

Read block 34 may perform a read operation based on the pipe address. The pipe address may be a memory address that points to a location in data storage system 16 where pipe state parameters 22 are stored. To perform the read operation, read block 34 may issue a read request to data storage system 16. The read request may include the pipe address. In response to receiving the read request, data storage system 16 may provide pipe state parameters (PSP) values that correspond to the current state of the pipe to read block 34. Read block 34 may provide the PSP values to modify block 36.

Modify block 36 may receive the PSP values and generate modified PSP values for the pipe state parameters based on one or more modification functions. In some examples, modify block 36 may generate the modified PSP values based on one or more of the logical pipe size, the physical pipe size minus one, and the requested number of packets. Modify block 36 may provide the modified PSP values to write block 38.

In some examples, the modification functions used by modify block 36 to generate the modified PSP values may correspond to the modification functions expressed in the pseudo-code shown in FIGS. 2-5. For example, when performing an atomic reserve write operation, modify block 36 may generate the modified PSP values based on the modification functions shown in lines 16-20 of the pseudo-code shown in FIG. 2. As another example, when performing an atomic commit write operation, modify block 36 may generate the modified PSP values based on the modification functions shown in lines 8-11 of the pseudo-code shown in FIG. 3.

As a further example, when performing an atomic reserve read operation, modify block 36 may generate the modified PSP values based on the modification functions shown in lines 16-20 of the pseudo-code shown in FIG. 4. As an additional example, when performing an atomic commit read operation, modify block 36 may generate the modified PSP values based on the modification functions shown in lines 8-12 of the pseudo-code shown in FIG. 5.

Write block 38 may perform a write operation based on the pipe address. The pipe address may be a memory address that points to a location in data storage system 16 where pipe state parameters 22 are stored. To perform the write operation, write block 38 may issue a write request to data storage system 16, and provide the modified PSP values to data storage system 16 for storage in data storage system 16. The write request may include the pipe address. In response to receiving the write request, data storage system 16 may store the modified PSP values in data storage system 16 (e.g., as part of pipe state parameters 22). The atomic read-modify-write operation is now complete.

Atomic operation datapath 32 may be configured to perform a read-modify-write operation as a non-interruptible set of operations. In other words, atomic operation datapath 32 may be configured to perform a current read-modify-write operation without allowing for other read-modify-write operation to interrupt the processing of the current read-modify-write operation. In this way, a hardware-based atomic read-modify-write operation may be provided for concurrently executing threads and/or tasks that may request such operations.

According to some aspects of this disclosure, modify block 36 may perform different modify operations for different pipe state parameters as part of a single, atomic read-modify-write operation. For example, modify block 36 may perform a first modify operation that generates a modified value for a first pipe state parameter based on a first modification function, and a second modify operation that generates a modified value for a second pipe state parameter based on a second modification function. The second modification function may be different than the first modification function. In this way, different pipe state parameters may be updated in different ways as part of a single atomic operation.

For example, to support an atomic reserve write operation or an atomic reserve read operation, a first modification function may be used to increment a reserved packet count parameter by the number of packets that are requested for the pipe reservation (FIG. 2, line 17; FIG. 4, line 17), and a second modification function may be used to increment a reservation count parameter by a constant value of one (FIG.

2, line 19; FIG. 4, line 19). As another example, to support an atomic commit write operation or an atomic commit read operation, a first modification function may be used to decrement a reservation count by a constant value of one (FIG. 3, line 8; FIG. 5, line 8), a second modification function may be used to increment or decrement a packet count parameter by an amount equal to the reservation count parameter (FIG. 3, line 10; FIG. 5, line 11), and a third modification function may be used to reset a reserved packet count parameter to zero (FIG. 3, line 11; FIG. 5, line 12). Other examples are possible and are within the scope of this disclosure.

According to additional aspects of this disclosure, modify block 36 may generate a modified value for one or more pipe state parameters based on the value of one or more additional pipe state parameters that are obtained from a memory subsystem (e.g., data storage system 16) during the performance of an atomic operation. For example, read block 34 may, during a single atomic read-modify-write operation, read a first value that corresponds to a first pipe state parameter and a second value that corresponds to a second pipe state parameter. As part of the same atomic read-modify-write operation, modify block 36 may generate a modified value for the second pipe state parameter based on the first value that corresponds to the first pipe state parameter. In this way, pipe state parameters may be updated in a single atomic operation based on the current state of the pipe.

For example, to support an atomic commit operation, a packet count parameter may be decremented or incremented by a reserved packet count parameter depending on whether the commit operation is a read commit operation or a write commit operation (FIG. 3, line 10; FIG. 5, line 11). As another example, to support an atomic commit read operation, a first packet offset parameter may be adjusted based on a reserved packet count parameter (FIG. 5, line 10). Other examples are possible and are within the scope of this disclosure.

According to additional aspects of this disclosure, modify block 36 may conditionally update a pipe state parameter value based on a different pipe state parameter value. Conditionally updating a pipe state parameter value may involve determining whether to update or not update the pipe state parameter value based on a different pipe state parameter value. In this way, pipe state parameters may be updated or not updated based on the current state of the pipe as part of a single atomic operation.

For example, to support an atomic reserve write operation or an atomic reserve read operation, modify block 36 may conditionally update the reserved packet count parameter and the reservation count parameter based on the packet count parameter and the reserved packet count parameter (FIG. 2, lines 16-20; FIG. 4, lines 16-20). As another example, to support an atomic commit write operation or an atomic commit read operation, modify block 36 may conditionally update the packet count parameter and the reserved packet count parameter based on the reservation count parameter (FIG. 3, lines 9-12; FIG. 5, lines 9-13). Other examples are possible and are within the scope of this disclosure.

Figure 8:
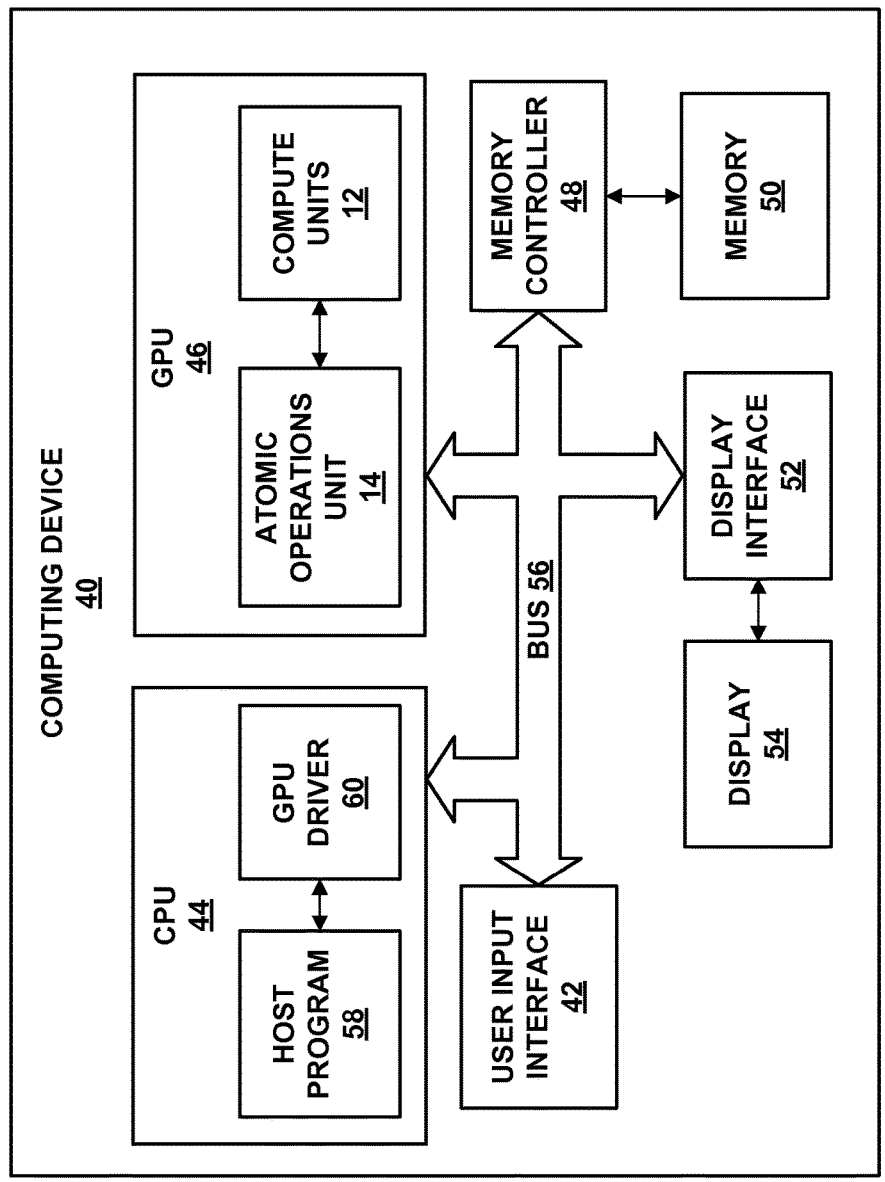
FIG. 8 is a block diagram illustrating an example computing device that may be used to implement the hardware-based atomic operations of this disclosure.

FIG. 8 is a block diagram illustrating an example computing device 40 that may be used to implement the hardware-based atomic operations of this disclosure. Computing device 40 may comprise a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 8, computing device 40 includes a user input interface 42, a CPU 44, a GPU 46, a memory controller 48, a memory 50, a display interface 52, a display 54 and a bus 56. User input interface 42, CPU 44, GPU 46, memory controller 48, and display interface 52 may communicate with each other using bus 56. It should be noted that the specific configuration of buses and communication interfaces between the different components shown in FIG. 8 is merely exemplary, and other configurations of computing devices and/or other graphics processing systems with the same or different components may be used to implement the techniques of this disclosure.

User input interface 42 may allow one or more user input devices (not shown) to be communicatively coupled to computing device 40. The user input devices may allow a user to provide input to computing device 40 via user input interface 42. Example user input devices include a keyboard, a mouse, a trackball, a microphone, a touch pad, a touch-sensitive or presence-sensitive display, or another input device. In examples where a touch-sensitive or presence-sensitive display is used as a user input device, all or part of user input interface 42 may be integrated with display 54.

CPU 44 may comprise a general-purpose or a special-purpose processor that controls operation of computing device 40. As shown in FIG. 8, CPU 44 may execute a host program 58 and a GPU driver 60. Host program 58 may act as a host program for a computing application that off-loads the execution of various tasks to GPU 46. In some examples, the tasks may be computationally-intensive tasks and/or tasks that include a high degree of parallelism, e.g., matrix calculations, signal processing calculations, statistical algorithms, molecular modeling applications, finance applications, medical imaging, cryptanalysis applications, etc. The host program 58 that executes on CPU 44 may be any type of software program including, for example, a general-purpose computing application, a parallel processing application, a spread sheet application, a word processor application, an email application, a media player application, a video game application, a graphical user interface application, an operating system, a graphics application, or any other type of application.

GPU driver 60 may receive instructions from host program 58, and cause GPU 46 to service the instructions. For example, GPU driver 60 may formulate one or more commands, place the commands into memory 50, and instruct GPU 46 to execute the commands. In some examples, GPU driver 60 may include a runtime program that supports an API that allows host program 58 to create pipes and allows tasks executing on compute devices (e.g., GPU 46) to communicate with each other by writing data to and reading data from a pipe.

Although not shown in FIG. 8, CPU 44 may also execute a compiler. The compiler may receive source code for one or more different types of tasks (e.g., kernels and/or compute shader programs) and generate compiled code for the tasks. GPU driver 60 may load the compiled code for one or more of the tasks onto GPU 46 (e.g., into an instruction store included in a compute unit of GPU 46) for execution by GPU 46.

In some examples, the source code for host program 58 may conform to a GPGPU API, a parallel programming API, and/or a heterogeneous computing platform API, such as for example, an OpenCL™ API. In further examples, the source code for the tasks that are compiled may conform to a GPGPU API, a parallel programming API, and/or a heterogeneous computing platform API, such as for example, an OpenCL™ C API.

GPU 46 may be configured to execute commands that are issued to GPU 46 by CPU 44. The commands executed by GPU 46 may include general-purpose computing commands, task execution commands (e.g., kernel execution commands), memory transfer commands, etc.

GPU 46 may be configured to perform general-purpose computing for applications executing on CPU 44. For example, when host program 58, which is executing on CPU 44, decides to off-load a computational task to GPU 46, CPU 44 may provide general-purpose computing data to GPU 46, and issue one or more general-purpose computing commands to GPU 46. The general-purpose computing commands may include, e.g., kernel execution commands, memory transfer commands, etc. In some examples, CPU 44 may provide the commands and general-purpose computing data to GPU 46 by writing the commands and data to memory 50, which may be accessed by GPU 46.

As shown in FIG. 8, GPU 46 includes atomic operations unit 14 and compute units 12. Compute units 12 may execute one or more tasks. In some examples, compute units 12 may concurrently execute multiple tasks. In further examples, one or more of compute units 12 may concurrently execute multiple instances of a task. An instance of a task that is executed by one of compute units 12 may be referred to as a thread and/or work-item. A task may be alternatively referred to as kernel. Atomic operations unit 14 may be configured to receive one or more different types of atomic operation commands from compute units 12, and to perform hardware-based atomic operations that correspond to each of the different types of atomic operation commands as described in this disclosure.

In some examples, in addition to performing general-purpose computing commands, GPU 46 may be configured to perform graphics operations to render one or more graphics primitives to display 54. In such examples, when one of the software applications executing on CPU 44 requires graphics processing, CPU 44 may provide graphics data to GPU 46 and issue one or more graphics commands to GPU 46. The graphics commands may include, e.g., draw call commands, GPU state programming commands, memory transfer commands, blitting commands, etc. The graphics data may include vertex buffers, texture data, surface data, etc. In some examples, CPU 44 may provide the commands and graphics data to GPU 46 by writing the commands and graphics data to memory 50, which may be accessed by GPU 46.

GPU 46 may, in some instances, be built with a highly-parallel structure that provides more efficient processing of vector operations than CPU 44. For example, GPU 46 may include a plurality of processing elements that are configured to operate on multiple vertices, control points, pixels and/or other data in a parallel manner. The highly parallel nature of GPU 46 may, in some instances, allow GPU 46 to process tasks that that include a high degree of parallelism more quickly than CPU 44. In addition, the highly parallel nature of GPU 46 may, in some examples, allow GPU 46 to render graphics images (e.g., GUIs and two-dimensional (2D) and/or three-dimensional (3D) graphics scenes) onto display 54 more quickly than rendering the images using CPU 44.

GPU 46 may, in some instances, be integrated into a motherboard of computing device 40. In other instances, GPU 46 may be present on a graphics card that is installed in a port in the motherboard of computing device 40 or may be otherwise incorporated within a peripheral device configured to interoperate with computing device 40. In further instances, GPU 46 may be located on the same microchip as CPU 44 forming a system on a chip (SoC). GPU 46 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 46 may include a GPU cache, which may provide caching services for all or a portion of memory 50. In such examples, GPU 46 may use the cache to process data locally using a local storage, instead of off-chip memory. This allows GPU 46 to operate in a more efficient manner by reducing the need for GPU 46 to access memory 50 via bus 56, which may experience heavy bus traffic, during each read and write command. In some examples, however, GPU 46 may not include a separate cache, but instead utilize memory 50 via bus 56. The GPU cache may include one or more volatile or non-volatile memories or storage devices, such as, e.g., random access memory (RAM), static RAM (SRAM), dynamic RAM (DRAM), etc.

Memory controller 48 facilitates the transfer of data going into and out of memory 50. For example, memory controller 48 may receive memory read and write commands, and service such commands with respect to memory 50 in order to provide memory services for the components in computing device 40. Memory controller 48 is communicatively coupled to memory 50. Although memory controller 48 is illustrated in the example computing device 40 of FIG. 8 as being a processing module that is separate from both CPU 44 and memory 50, in other examples, some or all of the functionality of memory controller 48 may be implemented on one or both of CPU 44 and memory 50.

Memory 50 may store program modules and/or instructions that are accessible for execution by CPU 44 and/or data for use by the programs executing on CPU 44. For example, memory 50 may store program code and graphics data associated with the applications executing on CPU 44. Memory 50 may additionally store information for use by and/or generated by other components of computing device 40. For example, memory 50 may act as a device memory for GPU 46 and may store data to be operated on by GPU 46 as well as data resulting from operations performed by GPU 46. For example, memory 50 may store any combination of buffer objects, pipe data, or the like. In addition, memory 50 may store command streams for processing by GPU 46 (e.g., command queues). Memory 50 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium. In some examples, memory 50 may correspond to all or part of data storage system 16 shown in FIG. 1.

CPU 44 and/or GPU 46 may store rasterized image data in a frame buffer that is allocated within memory 50. Display interface 52 may retrieve the data from the frame buffer and configure display 54 to display the image represented by the rasterized image data. In some examples, display interface 52 may include a digital-to-analog converter (DAC) that is configured to convert the digital values retrieved from the frame buffer into an analog signal consumable by display 54. In other examples, display interface 52 may pass the digital values directly to display 54 for processing.

Display 54 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 54 may be integrated within computing device 40. For instance, display 54 may be a screen of a mobile telephone handset or a tablet computer. Alternatively, display 54 may be a stand-alone device coupled to computer device 2 via a wired or wireless communications link. For instance, display 54 may be a computer monitor or flat panel display connected to a personal computer via a cable or wireless link.

Bus 56 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 56 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, GPU 46 (e.g., atomic operations unit 14) may perform a hardware-based atomic read-modify-write operation that modifies two or more pipe state parameters that are indicative of a state of a pipe. The pipe may correspond to a first-in-first-out (FIFO)-organized data buffer for supporting inter-task communication. Using hardware-based atomic read-modify-write operations to modify two or more pipe state parameter values in an atomic fashion may allow concurrently executing tasks and/or threads to modify the state of a pipe without requiring the use of locks and/or critical sections of code.

In some examples, to perform the hardware-based atomic read-modify-write operation, GPU 46 (e.g., atomic operations unit 14) may perform a non-interruptible set of operations. The non-interruptible set of operations may include an operation that reads values that correspond to the pipe state parameters from a memory subsystem (e.g., memory 50 and/or a cache included in GPU 46), an operation that generates modified values for the pipe state parameters, and an operation that writes the modified values for the pipe state parameters to the memory subsystem.

Example operation of computing device 40 will now be described. Host program 58 may issue an instruction to GPU driver 60 to create a pipe object. The instruction may specify the logical size of the pipe to be created. The logical size of the pipe may refer to the number of logical packet entries to include in the pipe.

In response to receiving the instruction to create the pipe object, GPU driver 60 may allocate memory space in memory 50 for the pipe object. The allocated memory space may include memory space allocated for pipe state parameters 22 and pipe data buffer 24 as illustrated in FIG. 1. In some examples, the number of physical packet entries allocated for the pipe may not necessarily be equal to the number of logical packet entries specified by host program 58 for the pipe. For example, GPU driver 60 may allocate memory for the pipe such that the number of physical packet entries is the first power of two that is greater than or equal to number of logical packet entries requested by host program 58. After allocating the pipe, GPU driver 60 may return a handle that identifies the pipe that was just created.

Host program 58 may create a task object (e.g., a kernel object) based on a task that is to be executed by GPU 46. Host program 58 may set one of the arguments for the task object to correspond to the previously created pipe (e.g., set the argument equal to the handle for the pipe). Host program 58 may issue an instruction to GPU driver 60 that causes the task object to be executed by GPU 46.

In response to receiving the instruction that causes the task object to be executed, GPU driver 60 may cause GPU 46 to execute a task that corresponds to the task object on one or more of compute units 12. For example, GPU driver 60 may place a command in a command queue for GPU 46 to cause GPU 46 to execute the task.

In some examples, GPU driver 60 may provide GPU 46 with one or more parameters and/or arguments that specify characteristics of the pipe. For example, GPU driver 60 may provide GPU 46 with one or more of a pipe address for the pipe, the physical pipe size minus one for the pipe, and/or the logical pipe size for the pipe. In some examples, GPU driver 60 and/or GPU 46 may cause the constant memory and/or constant registers of the compute units 12 that are executing the task to be populated with the parameters that specify the characteristics of the pipe.

In response to receiving the command that instructs GPU 46 to execute the task, GPU 46 assigns the task to one or more of compute units 12. The one or more of compute units 12 that are assigned to execute the task execute the task. In some examples, executing the task may involve executing a plurality of threads (i.e., instances of the task) in parallel.

The task and/or threads that are concurrently executing on compute units 12 issue one or more atomic operation commands to atomic operations unit 14. In response to receiving the atomic operation commands, atomic operations unit 14 performs one or more hardware-bases atomic operations as described in this disclosure. Execution of the task and/or threads continues until complete.

Figure 9:
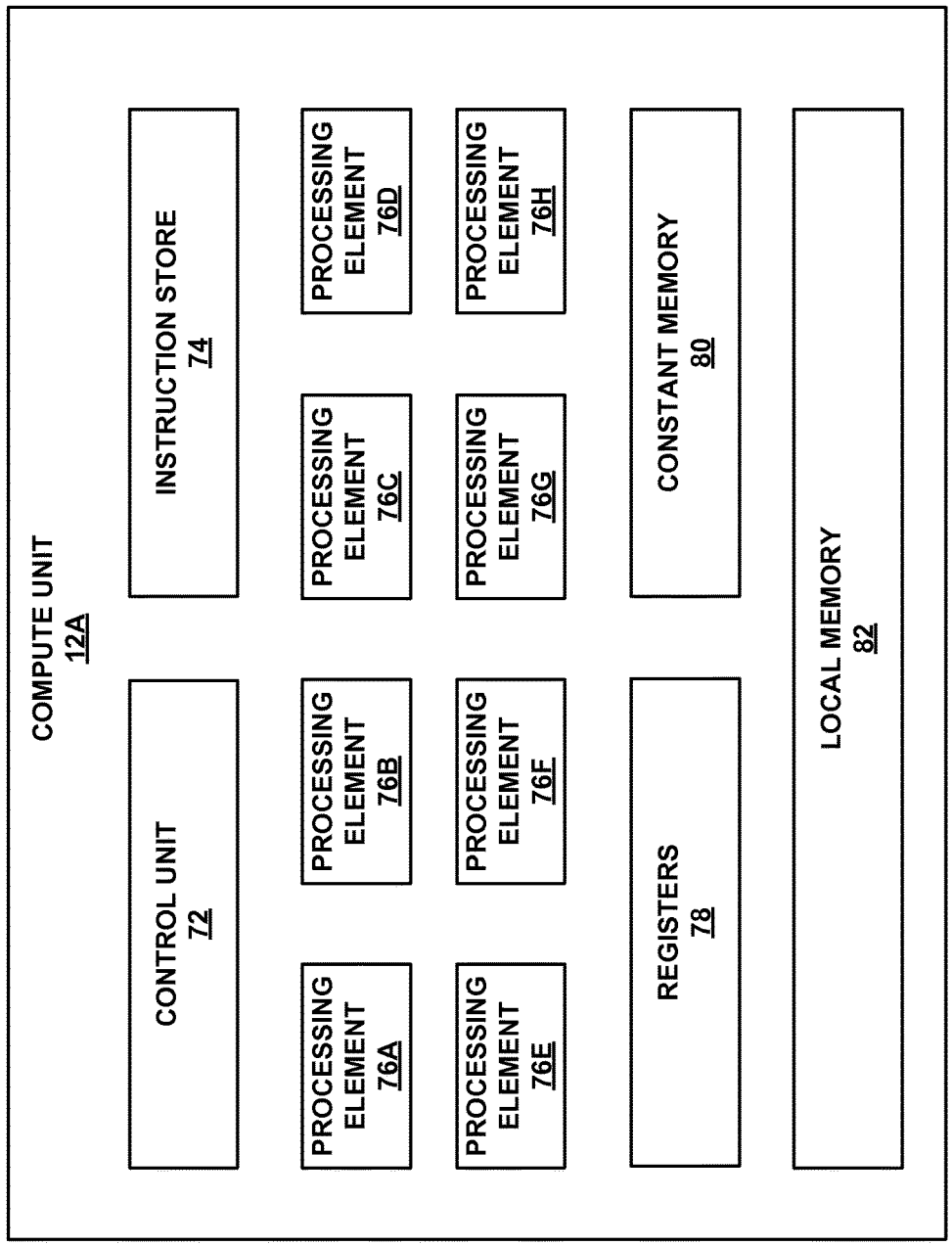
FIG. 9 is a block diagram illustrating an example compute unit that may be used in a graphics processing unit (GPU) or other compute device according to this disclosure.

FIG. 9 is a block diagram illustrating an example compute unit 12A that may be used in GPU 46 or another compute device according to this disclosure. Compute unit 12A may be configured to execute one or more different types of tasks based on compiled program code for the tasks that is accessible to compute unit 12A. Compute unit 12A includes a control unit 72, an instruction store 74, processing elements 76A-76H (collectively "processing elements 76"), registers 78, a constant memory 80 and a local memory 82.

Instruction store 74 is configured to store all or part of the program instructions for one or more tasks (e.g., kernels) that are to be executed by compute unit 12A. Instruction store 74 may be any type of storage unit including, e.g., volatile memory, non-volatile memory, a cache, random access memory (RAM), static RAM (SRAM), dynamic RAM (DRAM), etc. When instruction store 74 is a cache, instruction store 74 may cache program instructions that are stored in a memory external to compute unit 12A. Although instruction store 74 is illustrated as being inside of compute unit 12A, in other examples, instruction store 74 may be external to compute unit 12A.

Processing elements 76 are configured to execute threads of a task program. Each of processing elements 76 may execute a different thread. A thread may refer to an instance of a task that is executed with respect to a data item that is particular to the thread. Thus, each of processing elements 76 may be said to execute an instance of a task with respect to potentially different data items. The collection of threads that are executing in parallel on processing elements 76A-76H at a common point in time may be referred to as a wave of threads.

In the example compute unit 12A of FIG. 9, processing elements 76 may be single-instruction, multiple-data (SIMD) processing elements. SIMD processing elements refer to processing elements that, when activated, are configured to execute the same instruction at the same time with respect to different data. This may allow processing elements 76 to execute a plurality of threads of a task in parallel with respect to different data items. In some cases, each of processing elements 76 may execute instructions of a task based on a common program counter that points to an instruction contained in instruction store 74.

If one or more of processing elements 76 are deactivated, then such processing elements 76 do not execute a program instruction for a given instruction cycle. In some cases, control unit 72 may deactivate one or more of processing elements 76 to implement conditional branch instructions where the branching condition is satisfied for some threads and not satisfied for other threads.

In some examples, each of processing elements 76 may include and/or correspond to an arithmetic logic unit (ALU). In further examples, each of processing elements 76 may implement ALU functionality. ALU functionality may include addition, subtraction, multiplication, etc. In additional examples, each of processing elements 76 may be a scalar ALU or a vector ALU. A scalar ALU may operate on scalar data items, and a vector ALU may operate on vector data items. A scalar data item may include a single value corresponding to a single component for a scalar. A vector data item may include multiple values corresponding to the multiple components of a vector.

Each of processing elements 76 may read instructions from instruction store 74 and/or read data items from one or more of registers 78, constant memory 80, local memory 82 and an external memory. Each of processing elements 76 may write output data to one or more of registers 78, local memory 82 and an external memory.

Registers 78 may be dynamically allocated to various processing elements 76. In some cases, some or all of registers 78 may serve as input registers and/or output registers for the various threads executing on compute unit 12A. An input register may refer to a register that stores input data items for a task program, and an output register may refer to a register that stores output data items for a task program.

Constant memory 80 may store constant values that are used by the tasks executing on compute unit 12A. Constant memory 80 may be any type of memory including, e.g., volatile memory, random access memory (RAM), static RAM (SRAM), dynamic RAM (DRAM), electrically erasable programmable read-only memory (EEPROM), etc.

Local memory 82 may provide memory storage for use by the tasks executing on compute unit 12A. Local memory 82 may be any type of memory including, e.g., volatile memory, random access memory (RAM), static RAM (SRAM), dynamic RAM (DRAM), etc. In some examples, the address space for local memory 82 may be local to the processing elements 76 included in compute unit 12A. In other words, other compute units and/or other portions of GPU 46 may not be able to directly access local memory 82. Similarly, a host device may not be able to directly access local memory 82. In some examples, local memory 82 may be implemented on the same chip as compute unit 12A and/or GPU 46.

Example operation of compute unit 12A will now be described. GPU 46 may assign a task to compute unit 12A for execution. GPU 46 may store compile code for the task in instruction store 74. GPU 46 may store constant parameters for the task in constant memory 80, and input parameters for the task in registers 78. Processing elements 76 execute a plurality of instances of the task (i.e., threads) in parallel. One or more of the threads executing on processing elements 76 issue one or more of the atomic operation commands described in this disclosure.

To issue an atomic operations command, processing element 76A may specify one or more of registers 78 that contain the input parameters for the atomic operation command. Processing element 76A may issue the atomic operation command to atomic operations unit 14.

In some examples, for atomic commit write and atomic commit read commands, no return values are provided by atomic operations unit 14. For atomic reserve write and atomic reserve read commands, return values may be provided. For example, atomic operations unit 14 may return the first packet offset parameter, the packet count parameter, and the reserved packet count parameter. In some examples, registers 78 may include one or more quad register groups where each quad register group includes four registers, and data for the four registers can be read from and/or stored in memory as part of a single cache and/or memory transaction. In such examples, the three pipe state parameters that are returned by the atomic reserve write operation and/or atomic reserve read operation may, in some examples, be returned in three consecutive registers within a quad register group of registers 78. In this way, the three pipe state parameters may be fetched by compute unit 12A as part of a single cache and/or memory transaction.

Figure 10:
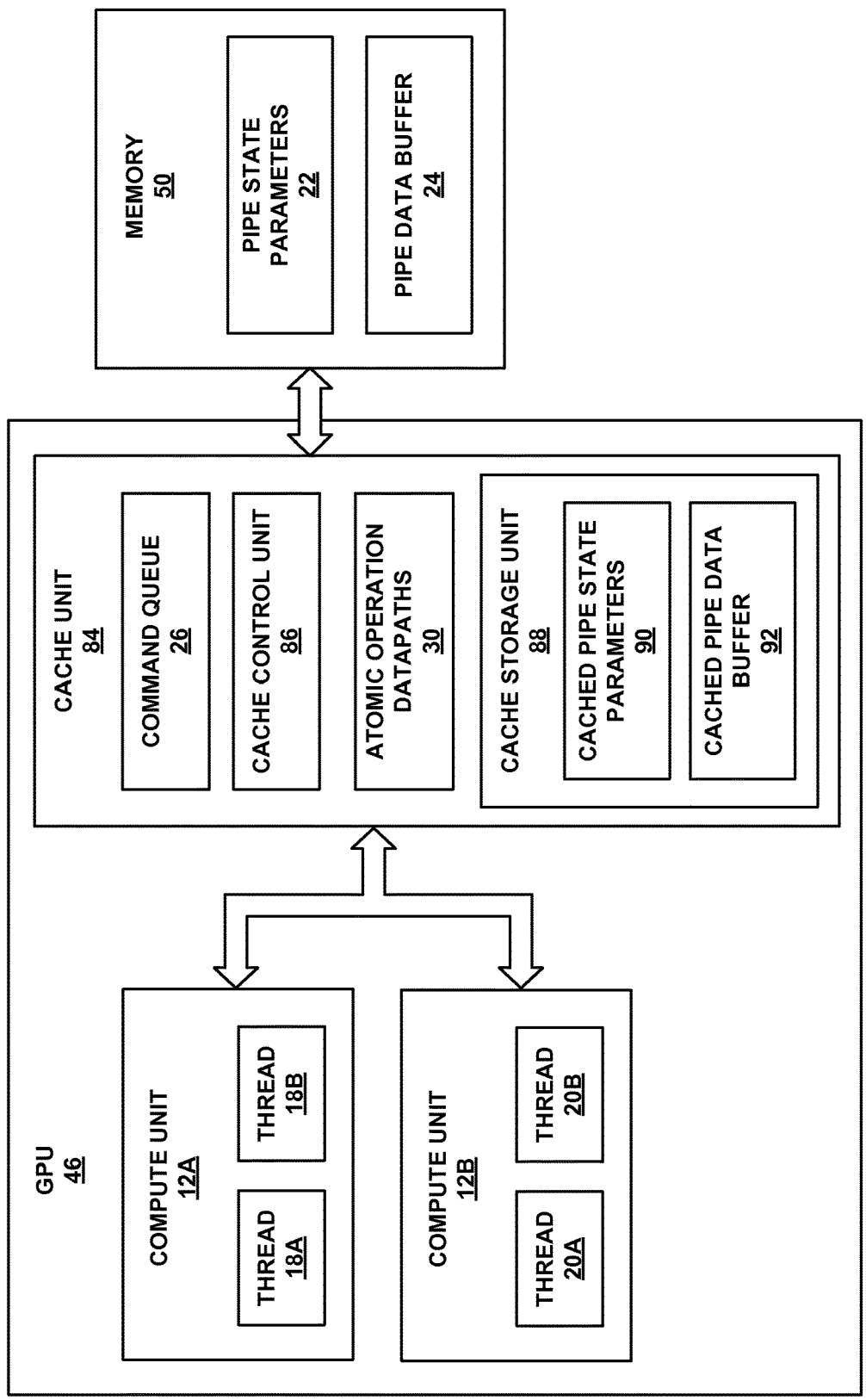
FIG. 10 is a block diagram illustrating a portion of the computing system of FIG. 1 in which an example GPU and memory configuration are illustrated in greater detail.

FIG. 10 is a block diagram illustrating a portion of the computing system 10 of FIG. 1 in which an example GPU 46 and memory configuration are illustrated in greater detail. The configuration illustrated in FIG. 10 may be used to implement the computing system 10 of FIG. 1 and/or the computing device 40 of FIG. 8.

As shown in FIG. 10, GPU 46 includes a cache unit 84. Cache unit 84 may provide caching services for compute units 12 in GPU 46. Cache unit 84 includes a command queue 26, a cache control unit 86, atomic operation datapaths 30, and a cache storage unit 88. Cache storage unit 88 may include one or both of cached pipe state parameters 90 and a cached pipe data buffer 92. Cached pipe state parameters 90 may be a cached copy of pipe state parameters 22, and cached pipe data buffer 92 may be a cached copy of pipe data buffer 24. In some examples, because the cached copies are cached, such copies may be incomplete and/or partial copies of their respective source data.

Cache unit 84 and memory 50 may form a memory subsystem, and cache storage unit 88 and memory 50 may form a data storage system in the memory subsystem. For example, the data storage system may correspond to data storage system 16 in FIG. 1.

Command queue 26 may be configured to store memory access commands received from compute units 12 and atomic operation commands received from compute units 12. Cache control unit 86 may process the memory access commands and the atomic operation commands. In some examples, cache control unit 86 may sequentially process the commands such that one command is processed at a time.

For memory access commands, cache control unit 86 may issue corresponding read requests and write requests to one or both of cache storage unit 88 and memory 50. For atomic operation commands, cache control unit 86 may cause one or more of atomic operation datapaths 30 to perform a hardware-based atomic operation that corresponds to the command. The hardware-based atomic operations implemented by atomic operation datapaths 30 may issue read requests and write requests to one or both of cache storage unit 88 and memory 50 to perform the atomic operations.

As shown in FIG. 10, the hardware-based atomic operations performed by atomic operations unit 14 (FIG. 6) may, in some examples, be incorporated into the cache unit 84 of a GPU 46. Incorporating the hardware-based atomic operations performed by atomic operations unit 14 into the cache unit 84 of a GPU 46 may allow some of the hardware that performs similar functionalities to be shared between atomic operations unit 14 and cache unit 84. In this way, a more compact circuit may be used for implementing the hardware-based atomic operations of this disclosure.

Figure 11:
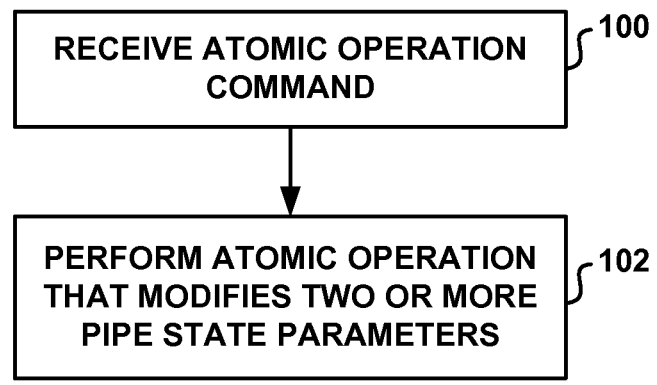
FIG. 11 is a flow diagram illustrating an example technique for performing hardware-based atomic operations according to this disclosure.

FIG. 11 is a flow diagram illustrating an example technique for performing hardware-based atomic operations according to this disclosure. The example technique illustrated in FIG. 11 is described with respect to atomic operations unit 14 of computing system 10. In some examples, atomic operations unit 14 may be included in a processor and/or processing unit, such as, e.g., a GPU (e.g., GPU 46), a CPU, a DSP, etc.

Atomic operations unit 14 receives an atomic operation command from compute unit 12A (100). Atomic operations unit 14 performs a hardware-based atomic read-modify-write operation that modifies two or more pipe state parameters that are indicative of a state of a pipe (102). The pipe may correspond to a FIFO-organized data buffer for supporting inter-thread communication.

A read-modify-write operation may be atomic in the sense that the operation is performed from start to end without interruption from any other read-modify-write operations that may be requested by other tasks and/or threads that are executing concurrently with the task or thread that requested the read-modify-write operation. In other words, during the performance of an atomic read-modify-write operation, no other threads and/or tasks may be able to read or modify the pipe state parameters that are modified by the currently-executing read-modify-write operation. In this way, race conditions may be avoided in cases where two or more tasks and/or threads attempt to modify the pipe state parameters of a pipe at the same time.

An atomic read-modify-write operation may be hardware-based in the sense that the atomic read-modify-write operation may be implemented by a hardware unit as a single, indivisible operation which may be invoked by threads and/or tasks that are communicatively coupled to the hardware unit. The single, indivisible operation may be indivisible in the sense that the hardware unit performs the operation from start to finish without interrupting the operation to perform other read-modify-write operations that may be requested by other tasks and/or threads that are executing concurrently with the task or thread that requested the read-modify-write operation. For example, if the hardware unit receives multiple requests to perform an atomic read-modify-write operation, the hardware unit may sequentially perform the atomic read-modify-write operation for each of the requests such that one atomic read-modify-write operation is performed at a time, and such that the performance of each atomic read-modify-write operation is completed prior to starting to perform another atomic read-modify-write operation. By using hardware-based atomic read-modify-write operations, multiple pipe state parameters may be modified by concurrently executing tasks and/or threads without requiring the tasks and/or threads to use mutex locks.

In some examples, atomic operations unit 14 may receive a plurality of requests (i.e., commands) to perform hardware-based atomic read-modify-write operations from a plurality of threads executing in parallel. In such examples, atomic operations unit 14 may sequentially perform a plurality of hardware-based atomic read-modify-write operations in response to receiving the plurality of requests to perform the hardware-based atomic read-modify-write operations. Each of the hardware-based atomic read-modify-write operations may be performed in response to a respective one of the plurality of requests. Sequentially performing the plurality of hardware-based atomic read-modify-write operations may involve performing the hardware-based atomic read-modify-write operations such that all pipe state parameter modifications associated with a first request from a first thread are completed prior to performing any of the pipe state parameter modifications associated with a second request from a second thread.

For example, atomic operations unit 14 may receive a first request from a first thread to perform an atomic operation. In response to receiving the first request, atomic operations unit 14 may perform a first hardware-based atomic read-modify-write operation to service the first request. Prior to completing the first hardware-based atomic read-modify-write operation, atomic operations unit 14 may receive a second request from a second thread to perform an atomic operation. In response to receiving the second request, atomic operations unit 14 may wait to commence performance of a second hardware-based atomic read-modify-write operation for servicing the second request until performance of the first hardware-based atomic read-modify-write operation is complete. After performance of the first hardware-based atomic read-modify-write operation is complete, atomic operations unit 14 may perform the second hardware-based atomic read-modify-write operation that modifies two or more pipe state parameters to service the second request.

Sequentially performing hardware-based atomic read-modify-write operations in the above-described manner may allow atomic operations unit 14 to ensure atomicity of the operations. In this way, pipe-based inter-task communication may be provided in a parallel computing system without necessitating the performance drawbacks and/or power consumption drawbacks associated with using software-based, mutual exclusion techniques for modifying pipe state parameters.

In some examples, the pipe state parameters may include one or more pipe reservation state parameters that are indicative of a reservation state of the pipe. For example, the reservation state parameters may include at least one of a parameter indicative of how many uncommitted reservations are currently pending for the pipe, and a parameter indicative of how many packet entries are currently reserved in the pipe. In further examples, the pipe state parameters may include a parameter indicative of how many packets are currently stored in the pipe, a parameter indicative of a packet entry that stores a starting packet for the pipe, a parameter indicative of how many uncommitted reservations are currently pending for the pipe, and a parameter indicative of how many packet entries are currently reserved in the pipe.

Figure 12:
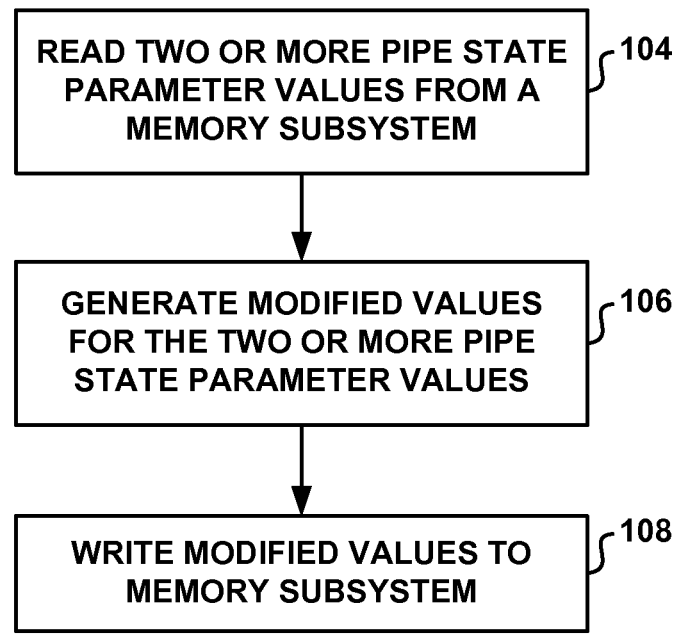
FIG. 12 is a flow diagram illustrating another example technique for performing hardware-based atomic operations according to this disclosure.

FIG. 12 is a flow diagram illustrating another example technique for performing hardware-based atomic operations according to this disclosure. The example technique illustrated in FIG. 12 is described with respect to atomic operations unit 14 of computing system 10. In some examples, atomic operations unit 14 may be included in a processor and/or processing unit, such as, e.g., a GPU (e.g., GPU 46), a CPU, a DSP, etc. In some examples, the example technique illustrated in FIG. 13 may implement process block 102 illustrated in FIG. 11.

Atomic operations unit 14 performs a read operation that reads values that correspond to two or more pipe state parameters from a memory subsystem (104). Atomic operations unit 14 performs a modify operation that generates modified values for the two or more pipe state parameters (106). Atomic operations unit 14 performs a write operation that writes the modified values for the pipe state parameters to the memory subsystem (108).

In some examples, the memory subsystem may include a data storage system 16. In such examples, writing the values to the memory subsystem and reading the values from the memory subsystem may involve writing values to and reading values form data storage system 16 included in the memory subsystem.

In some examples, process boxes 104, 106, and 108 may be performed as part of a non-interruptible set of operations. The operations may be non-interruptible in the sense that the operations are performed from start to finish without interrupting execution to perform other operations that may be associated with other read-modify-write operations (e.g., other read-modify write operations that are requested by tasks and/or threads that are executing concurrently with the task or thread that requested the currently executing read-modify-write operation). Causing a hardware unit to perform a non-interruptible read-modify-write sequence in this fashion allows the hardware unit to implement atomic read-modify-write operations for concurrently executing threads and/or tasks that may request such operations.

Figure 13:
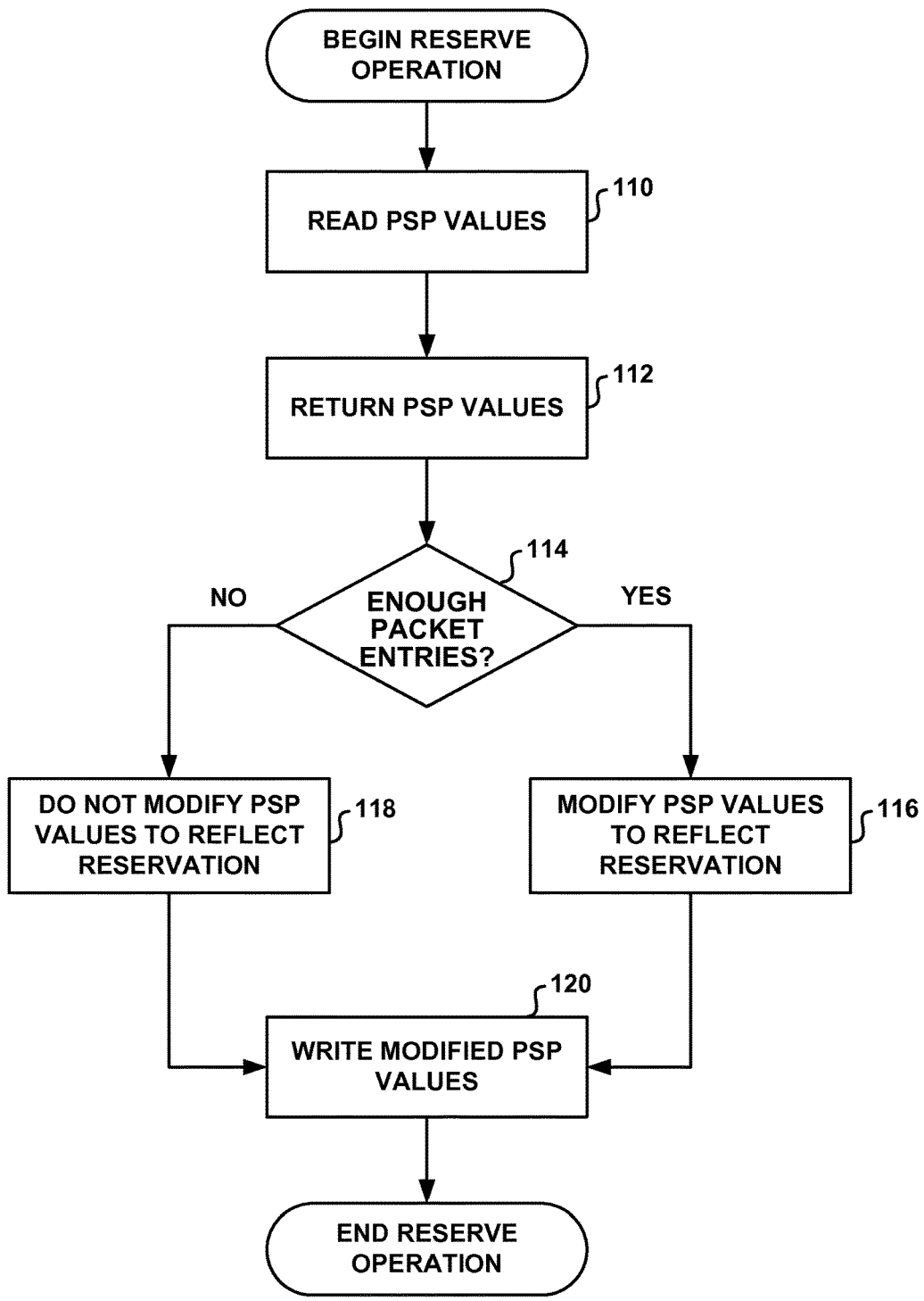
FIG. 13 is a flow diagram illustrating an example technique for performing an atomic reserve write operation and an atomic reserve read operation according to this disclosure.

FIG. 13 is a flow diagram illustrating an example technique for performing an atomic reserve write operation and an atomic reserve read operation according to this disclosure. The example technique illustrated in FIG. 13 is described with respect to atomic operations unit 14 of computing system 10. In some examples, atomic operations unit 14 may be included in a processor and/or processing unit, such as, e.g., a GPU (e.g., GPU 46), a CPU, a DSP, etc. In some examples, the example technique illustrated in FIG. 13 may implement the example technique illustrated in FIG. 12.

Atomic operations unit 14 performs a read operation that reads pipe state parameter (PSP) values from a memory subsystem (110). After performing the read operation, atomic operations unit 14 performs a return operation that returns one or more of the pipe state parameter values to the requesting thread and/or task (112).

After performing the read operation, atomic operations unit 14 performs a modify operation that generates modified values for the pipe state parameters (blocks 114-118). To perform the modify operation, atomic operations unit 14 performs an operation that determines whether the pipe has enough available entries to support the reservation request based on one or more of the pipe state parameters (114). In response to determining that the pipe has enough available entries to support the reservation request, atomic operations unit 14 performs an operation that generates modified values for the pipe state parameters such that the modified values reflect that a reservation has been made for the pipe (116).

In response to determining that the pipe does not have enough available entries to support the reservation request, atomic operations unit 14 may not perform an operation that generates modified values for the pipe state parameters such that the modified values reflect that a reservation has been made for the pipe (118). In other words, atomic operations unit 14 may generate modified values for the pipe state parameters such that the modified values are equal to the previous values for the pipe state parameters (i.e., such that the modified values reflect that a reservation has not been made for the pipe).

In examples where an atomic reserve write operation is performed, to determine whether the pipe has enough available entries to support the reservation request, atomic operations unit 14 may determine whether the pipe has enough uncommitted and unreserved entries to support a write reservation request based on one or more of the pipe state parameters. In examples where the an atomic reserve read operation is performed, to determine whether the pipe has enough available entries to support the reservation request, atomic operations unit 14 may determine whether the pipe has enough unread and unreserved packet entries in which packet data is stored to support the read reservation request.

After generating the modified values, atomic operations unit 14 performs a write operation that writes the modified values for the pipe state parameters to the memory subsystem (108). The reserve operation is now complete.

In some examples, the reserve operation may be a reserve write operation. In such examples, decision block 114 may, in some examples, be implemented by evaluating the expression shown on line 16 of FIG. 2. In addition, to generate modified pipe state parameter values that reflect that a reservation has been made for the pipe as described in process block 116, atomic operations unit 14 may update the pipe state parameter values based on the equations specified in lines 17-20 of FIG. 2.

In further examples, the reserve operation may be a reserve read operation. In such examples, decision block 114 may, in some examples, be implemented by evaluating the expression shown on line 16 of FIG. 4. In addition, to generate modified pipe state parameter values that reflect that a reservation has been made for the pipe as described in process block 116, atomic operations unit 14 may update the pipe state parameter values based on the equations specified in lines 17-10 of FIG. 4.

Figure 14:
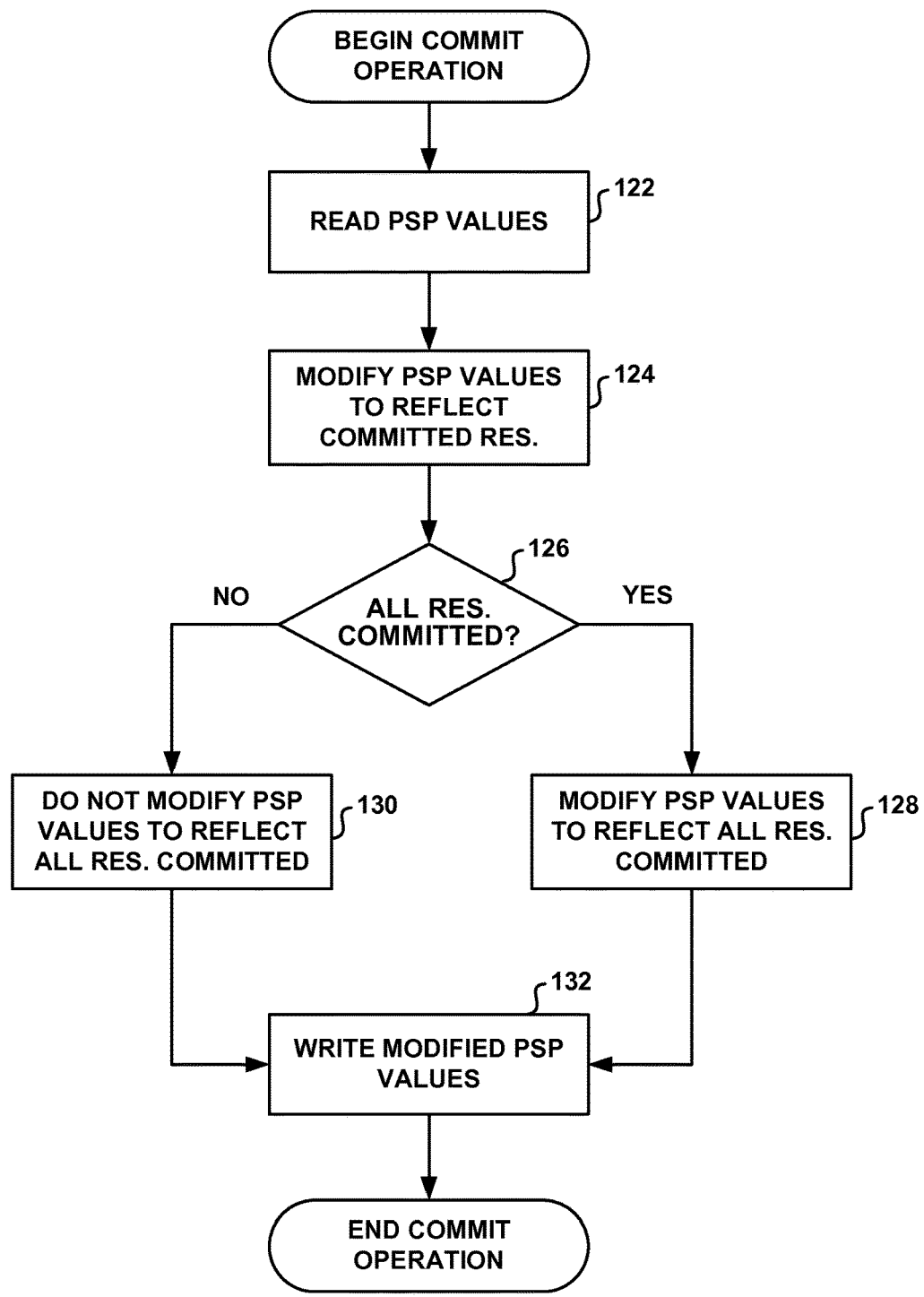
FIG. 14 is a flow diagram illustrating an example technique for performing an atomic commit write operation and an atomic commit read operation according to this disclosure.

FIG. 14 is a flow diagram illustrating an example technique for performing an atomic commit write operation and an atomic commit read operation according to this disclosure. The example technique illustrated in FIG. 14 is described with respect to atomic operations unit 14 of computing system 10. In some examples, atomic operations unit 14 may be included in a processor and/or processing unit, such as, e.g., a GPU (e.g., GPU 46), a CPU, a DSP, etc. In some examples, the example technique illustrated in FIG. 14 may implement the example technique illustrated in FIG. 12.

Atomic operations unit 14 performs a read operation that reads the pipe state parameter (PSP) values from a memory subsystem (122). After performing the read operation, atomic operations unit 14 performs a modify operation that generates modified values for the pipe state parameters (blocks 124-130). To perform the modify operation, atomic operations unit 14 may generate a modified value for a first pipe state parameter (e.g., the reservation count parameter)

to reflect that a reservation has been committed (124). In other words, atomic operations unit 14 may perform an operation that generates a modified value for a first pipe state parameter such that the modified value for the first pipe state parameter reflects that the pipe has one less uncommitted reservation relative to how many uncommitted reservations the pipe had prior to performing the commit operation.

Atomic operations unit 14 performs an operation that determines whether all reservations for the pipe have been committed based on one or more of the pipe state parameters (126). In response to determining that all reservations for the pipe have been committed, atomic operations unit 14 performs an operation that generates one or more modified values for the pipe state parameters such that the modified values reflect that entries have been committed to the pipe (128).

In response to determining that not all reservations for the pipe have been committed, atomic operations unit 14 does not perform an operation that generates one or more modified values for the pipe state parameters such that the modified values reflect that committed entries have been committed to the pipe (130). In other words, atomic operations unit 14 may generate modified values for the pipe state parameters other than the first pipe state parameter (e.g., the reservation count parameter) such that the modified values are equal to the previous values for the pipe state parameters.

In examples where an atomic commit write operation is performed, modifying the pipe state parameter values to reflect that the entries have been committed to the pipe may involve modifying the pipe state parameter values to reflect that the committed entries have been placed into the pipe and are available to consumer tasks. In examples where an atomic commit read operation is performed modifying the pipe state parameter values to reflect that the entries have been committed to the pipe may involve modifying the pipe state parameter values to reflect that the committed entries have been removed from the pipe.

After generating the modified values, atomic operations unit 14 performs a write operation that writes the modified values for the pipe state parameters to the memory subsystem (132). The commit operation is now complete.

In some examples, the commit operation may be a commit write operation. In such examples, process block 124 may, in some examples, be implemented based on the equation shown on line 8 of FIG. 3. In addition, decision block 126 may, in some examples, be implemented by evaluating the expression shown on line 9 of FIG. 3. Further, to generate modified pipe state parameter values that reflect that entries have been committed to the pipe as described in process block 128, atomic operations unit 14 may update the pipe state parameter values based on the equations specified in lines 10-11 of FIG. 3.

In further examples, the commit operation may be a commit read operation. In such examples, process block 124 may, in some examples, be implemented based on the equation shown on line 8 of FIG. 5. In addition, decision block 126 may, in some examples, be implemented by evaluating the expression shown on line 9 of FIG. 5. Further, to generate modified pipe state parameter values that reflect that entries have been committed to the pipe as described in process block 128, atomic operations unit 14 may update the pipe state parameter values based on the equations specified in lines 10-12 of FIG. 5.

In some examples, the techniques of this disclosure may implement a relatively efficient solution for OpenCL™ 2.0 pipes. The techniques may, in some examples, use specialized atomic functions to implement OpenCL™ 2.0 pipes.

An OpenCL™ 2.0 pipe act as a FIFO that can be used by multiple producer/multiple consumers via a reservation feature. The semantics for accessing a pipe may include calling a reserve(cnt) function where cnt indicates the requested number of packets for the reservation. If the reserve(cnt) function is successful, the reserve(cnt) function may return a reservation identification value (i.e., reserve_id). The semantics for accessing a pipe may further include, if the reserve(cnt) function is successful, calling a read pipe command using the reserved_id and an index from 0 to cnt−1. The index may indicate which packet entries are to be read from the pipe. The semantics for accessing a pipe may further include a commit(reserve_id) command that indicates that reading the pipe is finished, and that the packets may be removed from the pipe.

Maintaining the state of the pipe may require simultaneous (i.e., atomic) modification of multiple counters. This may be accomplished using mutex locks, which can in turn be implemented using compare-exchange atomic operations. Using mutex locks, however, may be inefficient because a large number of work-items may compete for the lock. This may result in multiple attempts needed for a successful acquire, thereby wasting power.

The techniques of this disclosure may, in some examples, use hardware atomic operations, which may be designed to support pipe reservation, commit and query operations, using a single hardware instruction per operation. In some examples, the atomic operations described in this disclosure may be implemented in a portion of a GPU pipeline that implements global GPU atomics. In further examples, the atomic operations described in this disclosure may allow a pipe to be used between a host CPU and a GPU if the implementation supports Shared Virtual Memory.

In some examples, the techniques of this disclosure may perform built-in pipe functions within a shader block of a GPU, and the instruction set architecture (ISA) for the shader block may include one or more of the atomic operation commands described in this disclosure. In further examples, the techniques of this disclosure may use dedicated hardware circuits to implement atomic operations.

In some examples, the techniques of this disclosure may add specialized atomics to a unified cache block (e.g., an L2 cache block) of a GPU. The specialized atomics may be accessed, in some examples, with additional ISA instructions. In some examples, pipes may be accessed using a reservation mechanism (e.g., reserve_read, read, commit_read, or, reserve_write, write, commit_write).

In some examples, the pipe state for a pipe may be represented by four 32-bit numbers: (1) First Packet Offset; (2) Packet Count; (3) Reserved Packet Count; and (4) Reservation Count. In such examples, these 32-bit numbers may, in some examples, correspond to the pipe state parameters described in this disclosure. In such examples, the four 32-bit numbers (e.g., pipe state parameters) may be located within a 128-bit block with 128-bit alignment, to allow reading/writing with a single memory transaction.

In some examples, the allocated size of a pipe may be a power of two. However, the actual depth of the pipe could be smaller than the allocated size. This may be due to the flexibility of the OpenCL™ API.

The techniques of this disclosure may, in some examples, provide support for OpenCL™ pipe reservation, commit and query. OpenCL™ pipes may be used either for reading (i.e., input pipe) or for writing (i.e., output pipe). A kernel may, in some examples, either read from a given pipe or write to it, not both.

In some examples, the techniques of this disclosure may be implemented in a shader processor, a stream processor, and/or a unified cache of a GPU. In some examples, the techniques of this disclosure may allow an unlimited number of pipes per kernel to be supported (e.g., limited only by available memory and constant registers to keep pipe state). In further examples, the feature of keeping pipe state in memory may be coupled with the Shared Virtual Memory feature of OpenCL™ 2.0 to contain pipes across host/device or across multiple devices.

In some examples, a pipe may be a memory object that stores data organized as a FIFO. A pipe may be alternatively referred to as a pipe object. In some cases, a pipe object may be accessed using built-in functions that read from and/or write to a pipe. In further cases, pipe objects may not be accessible from a host device. In some examples, a pipe object may encapsulate the following information: packet size in bytes, a maximum capacity of the pipe in packets, information indicative of the number of packets currently in the pipe, and the data packets included in the pipe.

In some examples, a pipe memory object may conceptually correspond to an ordered sequence of data items. For example, a pipe may have two endpoints: a write endpoint into which data items are inserted, and a read endpoint from which data items are removed. In some examples, at any one time, only one kernel instance (e.g., task) may write into a pipe, and only one kernel instance (e.g., task) may read from a pipe. In some examples, a pipe may support a producer-consumer design pattern, where one kernel instance connects to the write endpoint of the pipe (as the producer) while another kernel instance connects to the reading endpoint of the pipe (as the consumer).

In some cases, a pipe may be a type of memory object. A memory object may, in some examples, include the contents of global memory (e.g., a system memory). In some examples, a memory object may refer to a handle to a reference counted region of global memory.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
performing, with one or more processors, a hardware-based atomic read-modify-write operation that modifies, in a single memory transaction, two or more pipe state parameters that are indicative of a state of a pipe, the pipe corresponding to a data buffer for supporting inter-task communication, wherein the two or more pipe state parameters comprise at least two of a parameter that identifies how many packets are currently stored in the pipe, a parameter that identifies a packet entry that stores a starting packet for the pipe, a parameter that identifies how many uncommitted reservations are currently pending for the pipe, or a parameter that identifies how many packet entries are currently reserved in the pipe, wherein performing, with the one or more processors, the hardware-based atomic read-modify-write operation comprises performing a non-interruptible set of operations, the non-interruptible set of operations comprising:
an operation that reads values that correspond to the two or more pipe state parameters from a memory subsystem, wherein the operation that reads values that correspond to the two or more pipe state parameters from a memory subsystem comprises an operation that reads and returns data for three pipe state parameters in three consecutive registers within a quad register group of registers in the single memory transaction, the quad register group of registers comprising four registers;
an operation that generates modified values for the two or more pipe state parameters; and
an operation that writes the modified values for the two or more pipe state parameters to the memory subsystem.

2. The method of claim 1, wherein the two or more pipe state parameters comprise a first pipe state parameter and a second pipe state parameter, and wherein the operation that generates the modified values for the two or more pipe state parameters comprises:
  an operation that generates a modified value for the first pipe state parameter based on a first modification function; and
  an operation that generates a modified value for the second pipe state parameter based on a second modification function, the second modification function being different than the first modification function.

3. The method of claim 1, wherein the two or more pipe state parameters comprise a first pipe state parameter and a second pipe state parameter, wherein the operation that reads the values that correspond to the two or more pipe state parameters from the memory subsystem comprises an operation that reads a first value that corresponds to the first pipe state parameter, and wherein the operation that generates modified values for the two or more pipe state parameters comprises:
  an operation that generates a modified value for the second pipe state parameter based on the first value that corresponds to the first pipe state parameter.

4. The method of claim 1, wherein the operation that generates the modified values for the two or more pipe state parameters comprises:
  an operation that determines whether the pipe has enough uncommitted and unreserved entries to support a write reservation request based on one or more of the two or more pipe state parameters; and
  an operation that, in response to determining that the pipe has enough uncommitted and unreserved entries to support the write reservation request, generates the modified values for the two or more pipe state parameters such that the modified values reflect that a write reservation has been made for the pipe.

5. The method of claim 1, wherein the operation that generates the modified values for the two or more pipe state parameters comprises:
  an operation that determines whether the pipe has enough unread and unreserved packet entries in which packet data is stored to support a read reservation request based on one or more of the two or more pipe state parameters; and
  an operation that, in response to determining that the pipe has enough unread and unreserved packet entries in which packet data is stored to support the read reservation request, generates modified values for the two or more pipe state parameters such that the modified values reflect that a read reservation has been made for the pipe.

6. The method of claim 1, wherein the operation that generates the modified values for the two or more pipe state parameters comprises:
  an operation that generates a modified value for a first pipe state parameter of the two or more pipe state parameter values such that the modified value for the first pipe state parameter reflects that the pipe has one less uncommitted reservation relative to how many uncommitted reservations the pipe had prior to performing the hardware-based atomic read-modify-write operation;
  an operation that determines whether all reservations for the pipe have been committed based on one or more of the two or more pipe state parameters; and
  an operation that, in response to determining that all reservations for the pipe have been committed, generates the modified values for the two or more pipe state parameters such that the modified values reflect that committed entries have been placed into the pipe.

7. The method of claim 1, wherein the operation that generates the modified values for the two or more pipe state parameters comprises:
  an operation that generates a modified value for a first pipe state parameter of the two or more pipe state parameter values such that the modified value for the first pipe state parameter reflects that the pipe has one less uncommitted reservation relative to how many uncommitted reservations the pipe had prior to performing the hardware-based atomic read-modify-write operation;
  an operation that determines whether all reservations for the pipe have been committed based on one or more of the two or more pipe state parameters; and
  an operation that, in response to determining that all reservations for the pipe have been committed, generates modified values for the two or more pipe state parameters such that the modified values reflect that committed entries have been removed from the pipe.

8. The method of claim 1,
  wherein the method further comprises receiving, with a hardware unit included in the one or more processors, a first request from a first thread to perform an atomic operation,
  wherein the hardware-based atomic read-modify-write operation is a first hardware-based atomic read-modify-write operation,
  wherein performing, with the one or more processors, the first hardware-based atomic read-modify-write operation comprises performing, with the hardware unit, the first hardware-based atomic read-modify-write operation to service the first request in response to receiving the first request, wherein the method further comprises:
    prior to completing the first hardware-based atomic read-modify-write operation, receiving, with the hardware unit, a second request from a second thread to perform an atomic operation;
    in response to receiving the second request, waiting, with the hardware unit, to commence performance of a second hardware-based atomic read-modify-write operation for servicing the second request until performance of the first hardware-based atomic read-modify-write operation is complete; and
    after performance of the first hardware-based atomic read-modify-write operation is complete, performing, with the hardware unit, the second hardware-based atomic read-modify-write operation that modifies two or more pipe state parameters to service the second request.

9. The method of claim 1,
  wherein the one or more processors comprises a graphics processing unit (GPU), and
  wherein performing, with the one or more processors, the hardware-based atomic read-modify-write operation comprises performing, with the GPU, the hardware-based atomic read-modify-write operation that modifies the two or more pipe state parameters that are indicative of the state of the pipe.

10. The method of claim 1, wherein the data buffer comprises a first-in-first-out (FIFO)-organized data buffer for supporting inter-task communication.

11. The method of claim 1, wherein:
the two or more pipe state parameters comprise four pipe state parameters, each of the four pipe state parameters represented by a distinct 32-bit value located within a 128-bit block,
the four pipe state parameters comprise: the parameter that identifies how many packets are currently stored in the pipe, the parameter that identifies the packet entry that stores the starting packet for the pipe, the parameter that identifies how many uncommitted reservations are currently pending for the pipe, and the parameter that identifies how many packet entries are currently reserved in the pipe.

12. A device comprising:
a first-in-first-out (FIFO)-organized data buffer;
one or more processors configured to perform a hardware-based atomic read-modify-write operation that modifies, in a single memory transaction, two or more pipe state parameters that are indicative of a state of a pipe, the pipe corresponding to the first-in-first-out (FIFO)-organized data buffer for supporting inter-task communication, wherein the two or more pipe state parameters comprise at least two of a parameter that identifies how many packets are currently stored in the pipe, a parameter that identifies a packet entry that stores a starting packet for the pipe, a parameter that identifies how many uncommitted reservations are currently pending for the pipe, or a parameter that identifies how many packet entries are currently reserved in the pipe, wherein the one or more processors being configured to perform the hardware-based atomic read-modify-write operation comprises the one or more processors being configured to perform a non-interruptible set of operations, the non-interruptible set of operations comprising:
an operation that reads values that correspond to the two or more pipe state parameters from a memory subsystem, wherein the operation that reads values that correspond to the two or more pipe state parameters from a memory subsystem comprises an operation that reads and returns data for three pipe state parameters in three consecutive registers within a quad register group of registers in the single memory transaction, the quad register group of registers comprising four registers;
an operation that generates modified values for the two or more pipe state parameters; and
an operation that writes the modified values for the two or more pipe state parameters to the memory subsystem.

13. The device of claim 12, wherein the two or more pipe state parameters comprise a first pipe state parameter and a second pipe state parameter, and wherein the operation that generates modified values for the two or more pipe state parameters comprises:
an operation that generates a modified value for the first pipe state parameter based on a first modification function; and
an operation that generates a modified value for the second pipe state parameter based on a second modification function, the second modification function being different than the first modification function.

14. The device of claim 12, wherein the two or more pipe state parameters comprise a first pipe state parameter and a second pipe state parameter, wherein the operation that reads the values that correspond to the two or more pipe state parameters from the memory subsystem comprises an operation that reads a first value that corresponds to the first pipe state parameter, and wherein the operation that generates modified values for the two or more pipe state parameters comprises:
an operation that generates a modified value for the second pipe state parameter based on the first value that corresponds to the first pipe state parameter.

15. The device of claim 12, wherein the operation that generates the modified values for the two or more pipe state parameters comprises:
an operation that determines whether the pipe has enough uncommitted and unreserved entries to support a write reservation request based on one or more of the two or more pipe state parameters; and an operation that, in response to determining that the pipe has enough uncommitted and unreserved entries to support the write reservation request, generates the modified values for the two or more pipe state parameters such that the modified values reflect that a write reservation has been made for the pipe.

16. The device of claim 12, wherein the operation that generates the modified values for the two or more pipe state parameters comprises:
an operation that determines whether the pipe has enough unread and unreserved packet entries in which packet data is stored to support a read reservation request based on one or more of the two or more pipe state parameters; and
an operation that, in response to determining that the pipe has enough unread and unreserved packet entries in which packet data is stored to support the read reservation request, generates modified values for the two or more pipe state parameters such that the modified values reflect that a read reservation has been made for the pipe.

17. The device of claim 12, wherein the operation that generates the modified values for the two or more pipe state parameters comprises:
an operation that generates a modified value for a first pipe state parameter of the two or more pipe state parameter values such that the modified value for the first pipe state parameter reflects that the pipe has one less uncommitted reservation relative to how many uncommitted reservations the pipe had prior to performing the hardware-based atomic read-modify-write operation;
an operation that determines whether all reservations for the pipe have been committed based on one or more of the two or more pipe state parameters; and
an operation that, in response to determining that all reservations for the pipe have been committed, generates the modified values for the two or more pipe state parameters such that the modified values reflect that committed entries have been placed into the pipe.

18. The device of claim 12, wherein the operation that generates the modified values for the two or more pipe state parameters comprises:
an operation that generates a modified value for a first pipe state parameter of the two or more pipe state parameter values such that the modified value for the first pipe state parameter reflects that the pipe has one less uncommitted reservation relative to how many uncommitted reservations the pipe had prior to performing the hardware-based atomic read-modify-write operation;
an operation that determines whether all reservations for the pipe have been committed based on one or more of the two or more pipe state parameters; and an operation that, in response to determining that all reservations for the pipe have been committed, generates modified values for the two or more pipe state parameters such that the modified values reflect that committed entries have been removed from the pipe.

19. The device of claim 12,
wherein the one or more processors comprises a graphics processing unit (GPU), and
wherein the one or more processors are further configured to perform the hardware-based atomic read-modify-write operation that modifies the two or more pipe state parameters that are indicative of the state of the pipe.

20. The device of claim 12, wherein the device comprises at least one of a wireless communication device and a mobile phone handset.

21. An apparatus comprising:
means for storing two or more pipe state parameters that are indicative of a state of a pipe in a single memory transaction, the pipe corresponding to a first-in-first-out (FIFO)-organized data buffer for supporting inter-task communication, wherein the two or more pipe state parameters comprise at least two of a parameter that identifies how many packets are currently stored in the pipe, a parameter that identifies a packet entry that stores a starting packet for the pipe, a parameter that identifies how many uncommitted reservations are currently pending for the pipe, or a parameter that identifies how many packet entries are currently reserved in the pipe; and
means for performing a hardware-based atomic read-modify-write operation that modifies the two or more pipe state parameters with a non-interruptible set of operations, the non-interruptible set of operations comprising:
an operation that reads values that correspond to the two or more pipe state parameters from a memory subsystem, wherein the operation that reads values that correspond to the two or more pipe state parameters from a memory subsystem comprises an operation that reads and returns data for three pipe state parameters in three consecutive registers within a quad register group of registers in the single memory transaction, the quad register group of registers comprising four registers;
an operation that generates modified values for the two or more pipe state parameters; and
an operation that writes the modified values for the two or more pipe state parameters to the memory subsystem.

22. A non-transitory computer-readable storage medium having instructions stored thereon that, when executed, cause one or more processors to:
perform a hardware-based atomic read-modify-write operation that modifies, in a single memory transaction, two or more pipe state parameters that are indicative of a state of a pipe, the pipe corresponding to a first-in-first-out (FIFO)-organized data buffer for supporting inter-task communication, wherein the two or more pipe state parameters comprise at least two of a parameter that identifies how many packets are currently stored in the pipe, a parameter that identifies a packet entry that stores a starting packet for the pipe, a parameter that identifies how many uncommitted reservations are currently pending for the pipe, or a parameter that identifies how many packet entries are currently reserved in the pipe, wherein the hardware-based atomic read-modify-write operation comprises a non-interruptible set of operations, the non-interruptible set of operations comprising:
an operation that reads values that correspond to the two or more pipe state parameters from a memory subsystem, wherein the operation that reads values that correspond to the two or more pipe state parameters from a memory subsystem comprises an operation that reads and returns data for three pipe state parameters in three consecutive registers within a quad register group of registers in the single memory transaction, the quad register group of registers comprising four registers;
an operation that generates modified values for the two or more pipe state parameters; and
an operation that writes the modified values for the two or more pipe state parameters to the memory subsystem.

* * * * *